US008515426B2

(12) United States Patent
Matsuo et al.

(10) Patent No.: US 8,515,426 B2
(45) Date of Patent: Aug. 20, 2013

(54) USER EQUIPMENT, BASE STATION DEVICE, COMMUNICATION SYSTEM, AND HANDOVER CONTROL METHOD

(75) Inventors: Hidenori Matsuo, Kanagawa (JP); Takahisa Aoyama, Kanagawa (JP)

(73) Assignee: Panasonic Corporation, Osaka (JP)

( * ) Notice: Subject to any disclaimer, the term of this patent is extended or adjusted under 35 U.S.C. 154(b) by 165 days.

(21) Appl. No.: 13/139,385

(22) PCT Filed: Dec. 11, 2009

(86) PCT No.: PCT/JP2009/006803
§ 371 (c)(1),
(2), (4) Date: Jun. 13, 2011

(87) PCT Pub. No.: WO2010/070854
PCT Pub. Date: Jun. 24, 2010

(65) Prior Publication Data
US 2011/0244863 A1 Oct. 6, 2011

(30) Foreign Application Priority Data

Dec. 15, 2008 (JP) ................................. 2008-318735
Aug. 6, 2009 (JP) ................................. 2009-183215

(51) Int. Cl.
*H04W 36/00* (2009.01)
(52) U.S. Cl.
USPC ........................................................ 455/436
(58) Field of Classification Search
USPC .............. 455/422.1, 444, 436, 442, 522, 502, 455/443, 501, 296, 448, 452.1, 509; 370/350, 370/315, 336, 348, 328, 312, 331
See application file for complete search history.

(56) References Cited

U.S. PATENT DOCUMENTS

| 2003/0153335 A1* | 8/2003 | Johnson et al. ............... 455/502 |
| 2004/0029588 A1 | 2/2004 | Kikuma |
| 2005/0130662 A1* | 6/2005 | Murai ........................... 455/444 |
| 2009/0042596 A1* | 2/2009 | Yavuz et al. ................... 455/522 |

FOREIGN PATENT DOCUMENTS

| JP | 2000-23229 | 1/2000 |
| JP | 2004-48528 | 2/2004 |
| JP | 2007-514367 | 5/2007 |

OTHER PUBLICATIONS

International Search Report dated Mar. 9, 2010.
3GPP TSG-RAN2 Meeting #63bis, "Email report on 'Home-(e)NB mobility, main issues' [63_LTE_C01]," Rapporteur (Huawei), R2-085705, Sep. 29-Oct. 3, 2008, pp. 1-25.

(Continued)

*Primary Examiner* — Kiet Doan
(74) *Attorney, Agent, or Firm* — Dickinson Wright PLLC

(57) ABSTRACT

In a user equipment (UE)(100), a handover from a macro cell base station (eNB)(200) to a CSG cell base station (HeNB)(300) is controlled based on a result of comparison between reception quality from the eNB (200) and reception quality from the HeNB (300) located in a macro cell. The UE (100) comprises: a reception quality measurement unit (104) for measuring the reception quality of the eNB (200) and the reception quality of the HeNB (300); an offsetting unit (106) for offsetting the reception quality of the HeNB (300) with an offset value that makes the reception quality of the HeNB (300) relatively higher than the reception quality of the eNB (200); and an offset value correcting unit (105) for correcting the offset value according to the reception quality of the eNB (200). A user equipment is thereby provided in which handover control can be performed with an appropriate offset value that takes into consideration interference in the uplink from the user equipment to the base station.

7 Claims, 33 Drawing Sheets

(56) References Cited

OTHER PUBLICATIONS

3GPP TSG-RAN WG2 Meeting #63, "Way forward for handover to HeNB," Telecom Italia, et al., R2-084736, Aug. 18-22, 2008, pp. 1-2, p. 5, Line 26.

3GPP TS 36.331 V8.3.0, "3rd Generation Partnership Project; Technical Specification Group Radio Access Network; Evolved Universal Terrestrial Radio Access (E-UTRA) Radio Resource Control (RRC); Protocol specification (Release 8)," Sep. 2008, pp. 1-178, p. 5, Line 27.

* cited by examiner

FIG.28
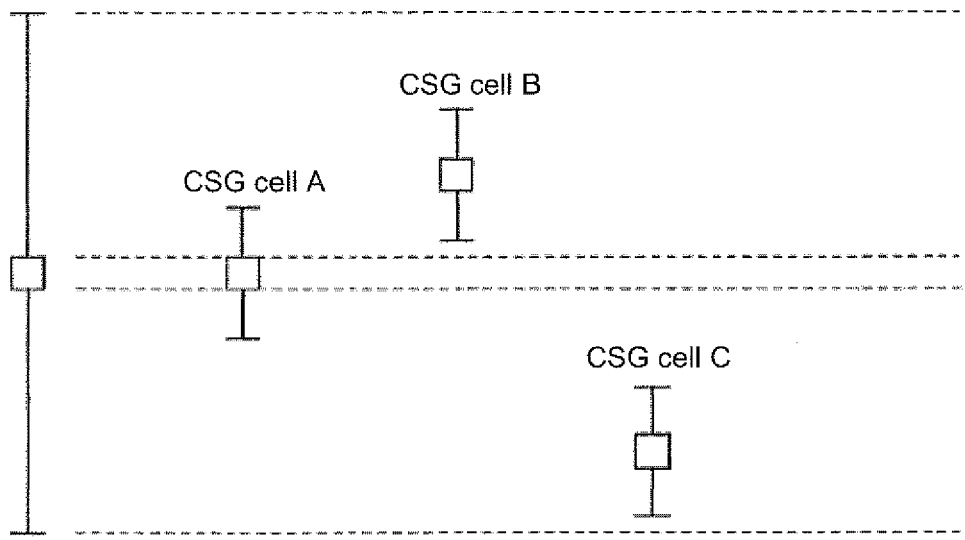
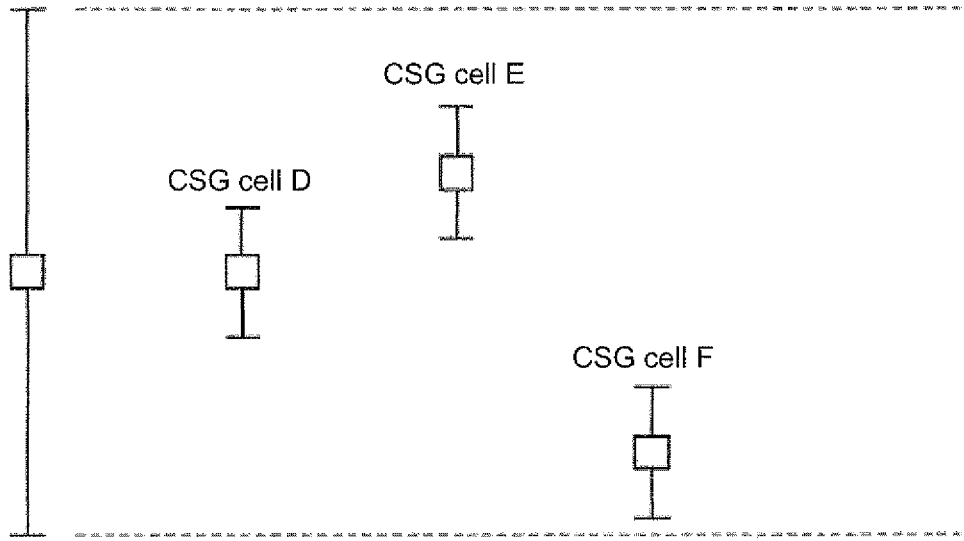

USER EQUIPMENT, BASE STATION DEVICE, COMMUNICATION SYSTEM, AND HANDOVER CONTROL METHOD

TECHNICAL FIELD

The present invention relates to a user equipment in which a handover is controlled based on reception quality of a signal from a base station.

BACKGROUND ART

Recently, one idea under consideration in 3GPP is that providing a home base station (HeNB) for use indoors in a cell formed by a regular base station (eNB), or a macro cell, to form a CSG cell. The HeNB has a function of regulating user equipment (UE) that may be allowed to access the HeNB, and the UE can only access an HeNB for which the UE has access permission. Accordingly, even when the UE detects an HeNB, the UE cannot connect to the HeNB without access permission no matter how good reception quality the HeNB has.

To obtain access permission, the UE must examine a cell identification (cell ID) included in system information transmitted from the HeNB. Cell IDs include a physical cell ID (PCI) that locally identifies an eNB, a cell global ID (CGI) that uniquely identifies every eNB, and the like. In this case, the latter, COI, is used to uniquely identify the eNB. The UE checks a CGI received in the system information against a list of CGIs of accessible HeNBs, or whitelist, notified from a network. If the CGI owned by the detected HeNB is included in the whitelist, then it is determined that the HeNB is accesible.

The UE may connect to the CSG cell to obtain services specific to the CSG cell such as high-speed, high-quality communication and low price communication. As long as the UE has access permission, therefore, it is desirable that the UE is controlled to connect to the CSG cell (i.e. handed over from the eNB to the HeNB) as much as possible.

When an UE is handed over between eNBs, the UE first measures reception quality of signals from eNBs around the UE, and when the UE detects an eNB of good reception quality, the UE tries to perform a handover to the eNB. At the time when the UE is handed over from an eNB to an HeNB, however, the handover cannot be accomplished only by detecting an HeNB of good reception quality, and it is still necessary to perform a process of checking the presence of access permission for the HeNB of handover destination.

Specific details of a conventional process of a handover to a CSG cell will now be described below with reference to drawings. FIG. 31 is a diagram for illustrating an arrangement of a macro cell and CSG cells, and FIG. 32 is a sequence diagram showing a handover to a CSG cell. Here, description will be made by way of illustration to a case where an accessible CSG cell (PCI=35, CGI=305) is present near a UE camping on a base station (eNB) of a macro cell as shown in FIG. 31.

In this case, as shown in FIG. 32, the eNB first transmits a setting (measurement control) signal necessary for reception quality measurement to the UE (S100). The UE measures reception quality of signals from nearby base stations (eNB and HeNB) based on the setting signal (S101). In this measurement, PCIs of eNBs and HeNBs located around the UE are detected. The UE also has a function of distinguishing whether the detected base station is an eNB or an HeNB based on the PCIs.

Next, the UE transmits a result notification of reception quality measurement (measurement report) to the eNB (S102). In this case, if a certain condition between the reception quality of the signal from the base station (eNB) to which the UE is currently connected and that from a nearby base station (HeNB) is satisfied (for example, the reception quality of the HeNB exceeds that of the eNB), the UE notifies the eNB of the reception quality of the eNB and that of the HeNB that has better reception quality along with the PCI of the HeNB as a measurement result notifying signal (measurement report).

Subsequently, the eNB transmits setting information (measurement configuration) necessary for access verification to the UE (S103). Even when the PCI included in the measurement report is that of the HeNB, other HeNBs, if any as shown in FIG. 31, that have the same PCI prevent the eNB from distinguishing which HeNB is the nearby base station (HeNB) notified in the measurement report. Therefore, the UE receives a CGI, which is a unique cell identification, from system information transmitted from the HeNB, checks the CGI against the whitelist retained by the UE for access verification, and then measures the reception quality of the HeNB again (S104).

The UE then transmits a result notification of the access verification (measurement report) to the eNB (S105). In this case, the measurement report notifies the result of the reception quality remeasurement of the HeNB along with the CGI of the HeNB.

As another way of checking the presence of access permission of the detected HeNB, it is conceivable to refer to history information (fingerprints) of accessible HeNBs that have been previously detected, if any retained by the UE, to determine whether or not the detected HeNB is accessible. The history information includes, for example, a cell identification such as a PCI and a CGI, positional information of the HeNB (GPS information), and the like. In this case, in the step S102, a measurement report is issued to the eNB only for an HeNB that satisfies a certain condition and that the UE has access permission. Therefore, the steps S103 to S105 may be omitted.

When the UE has access permission for the detected HeNB, the eNB transmits a handover request to the HeNB (S106). In this case, the eNB transmits the handover request to a base station of handover destination (the HeNB) via an HeNBGW, which is an access gateway, or MME. When the HeNB that receives the handover request determines that the handover of the UE may be allowed, the HeNB transmits a handover response signal to the eNB via HeNBGW or MME (S107).

Upon receiving the handover response, the eNB transmits a handover command signal to the UE (S108). The handover command includes an identification of the UE for the HeNB (C-RNTI) and information necessary for the UE to perform uplink synchronization. Upon receiving the handover command, the UE transmits a random access preamble to the HeNB to perform the uplink synchronization (S109). Upon receiving the random access preamble, the HeNB performs uplink allocation for the UE and notifies the allocation information to the UE. Once the UE is successfully connected to the HeNB, then the UE transmits a handover confirmation signal to the HeNB (S111) notifying that the handover has been completed in the UE. Such handover control to a CSG cell is proposed by 3GPP or the like (for example, see Non Patent Literature 1).

In 3GPP, incidentally, a mixed carrier environment where a CSG cell and a macro cell use the same frequency is under consideration. When the same frequency is used, there may be a problem of interference between a signal from a UE connected to the CSG cell and that from another UE connected to a macro cell. The amount of uplink (UL) interference varies depending on the location of the UE in the macro cell. For example, when the UE is located near an eNB, the macro cell is much affected by the UL interference, and when the UE is located at a macro cell edge, the macro cell is less affected by the UL interference.

As described above, it is desirable that the UE is controlled to connect to the CSG cell as much as possible, as long as the CSG cell is accessible. Conventionally, therefore, an offset is added to the measurement result of reception quality of an accessible HeNB when the reception quality is measured. With this offsetting, an HeNB is more likely to be selected as a handover candidate; in other words, the UE is controlled to perform a handover preferentially to the HeNB.

Conventional offsetting will now be described in detail with reference to the drawing. FIG. 33 shows conventional offsetting. For example, in common handover control, a handover is initiated if the following Formula 1 is satisfied as a result of reception quality measurement:

Reception quality of eNB<reception quality of HeNB. (Formula 1)

In contrast, in handover control with offsetting, an offset value (positive offset value) is added to reception quality of an HeNB as in the following Formula 2 so that the UE is more likely to be handed over to the HeNB, as shown in FIG. 33 (for example, see Non Patent Literature 2):

Reception quality of eNB<reception quality of HeNB+offset value. (Formula 2)

Citation List

Non Patent Literature
Non Patent Literature 1: 3GPP RAN2 #63 contribution R2-084736
Non Patent Literature 2: 3GPP TS36.331 ver8.3.0 section 5.5.4.4

In conventional offsetting, however, there are the respective problems as described below both in the case where a large offset value is set (i.e. an aggressive offset value is used) and in the case where a small offset value is set (i.e. a negative offset value is used).

In the case of the aggressive offset values, the UE is controlled to select the HeNB more easily. Accordingly, even when the UE is located away from the HeNB (i.e. the HeNB has lower reception quality), the Formula 2 above is satisfied by an added large offset value, which causes the UE to be handed over to the HeNB. In this case, the transmission power of the UE (uplink transmission power) is controlled to increase as the distance between the UE and the HeNB increases. When the UE is located near the macro cell base station (eNB) in particular, this increases the UL interference affecting the macro cell (i.e. UL interference with another UE connected to the eNB).

On the other hand, in case of negative offset values, the UE is controlled to select the HeNB less easily. Accordingly, when the UE is located relatively far away from the HeNB (i.e. the HeNB has lower reception quality), the Formula 2 above is no longer satisfied by an added small offset value, which prevents the UE from being handed over to the HeNB. Incidentally, when the UE is located at a cell edge, the macro cell is less affected by the UL interference (than the case where the UE is located near the eNB). In this case, therefore, the tolerance to the UL interference is high; that is, even when the transmission power of the UE is controlled to increase, the UL interference is less likely to occur. In other words, when the UE is located at a cell edge, a larger offset value can be used to control the UE to actively perform a handover. In case of small offset values, however, it is likely that the UE, which is desirably controlled to connect to the CSG cell as much as possible, misses an opportunity to be handed over to the HeNB.

SUMMARY OF INVENTION

Technical Problem

The present invention has been made under such circumstances. It is an object of the invention to provide a user equipment in which appropriate handover control can be performed by using an offset value depending on reception quality of a signal from a base station.

Solution to Problem

One aspect of the invention is a user equipment, in which a handover from a macro cell base station to a small cell base station is controlled based on a result of comparison between macro cell reception quality and small cell reception quality, the macro cell reception quality being reception quality of a signal from the macro cell base station and the small cell reception quality being reception quality of a signal from the small cell base station located in a macro cell, and the user equipment comprises: a reception quality measurement unit for measuring the macro cell reception quality and the small cell reception quality; an offsetting unit for offsetting the macro cell reception quality or the small cell reception quality with an offset value that makes the small cell reception quality relatively higher than the macro cell reception quality; and an offset value selecting unit for selecting an offset value used for offsetting among a plurality of offset values based on the macro cell reception quality.

As described below, the present invention has other aspects. Therefore, the disclosure of the invention is intended to provide some of the aspects of the invention, and is not intended to limit the scope of the invention as described and claimed herein.

BRIEF DESCRIPTION OF DRAWINGS

FIG. 28 is a diagram for illustrating another example of inter-frequency measurement.

DESCRIPTION OF EMBODIMENTS

Figure 1:
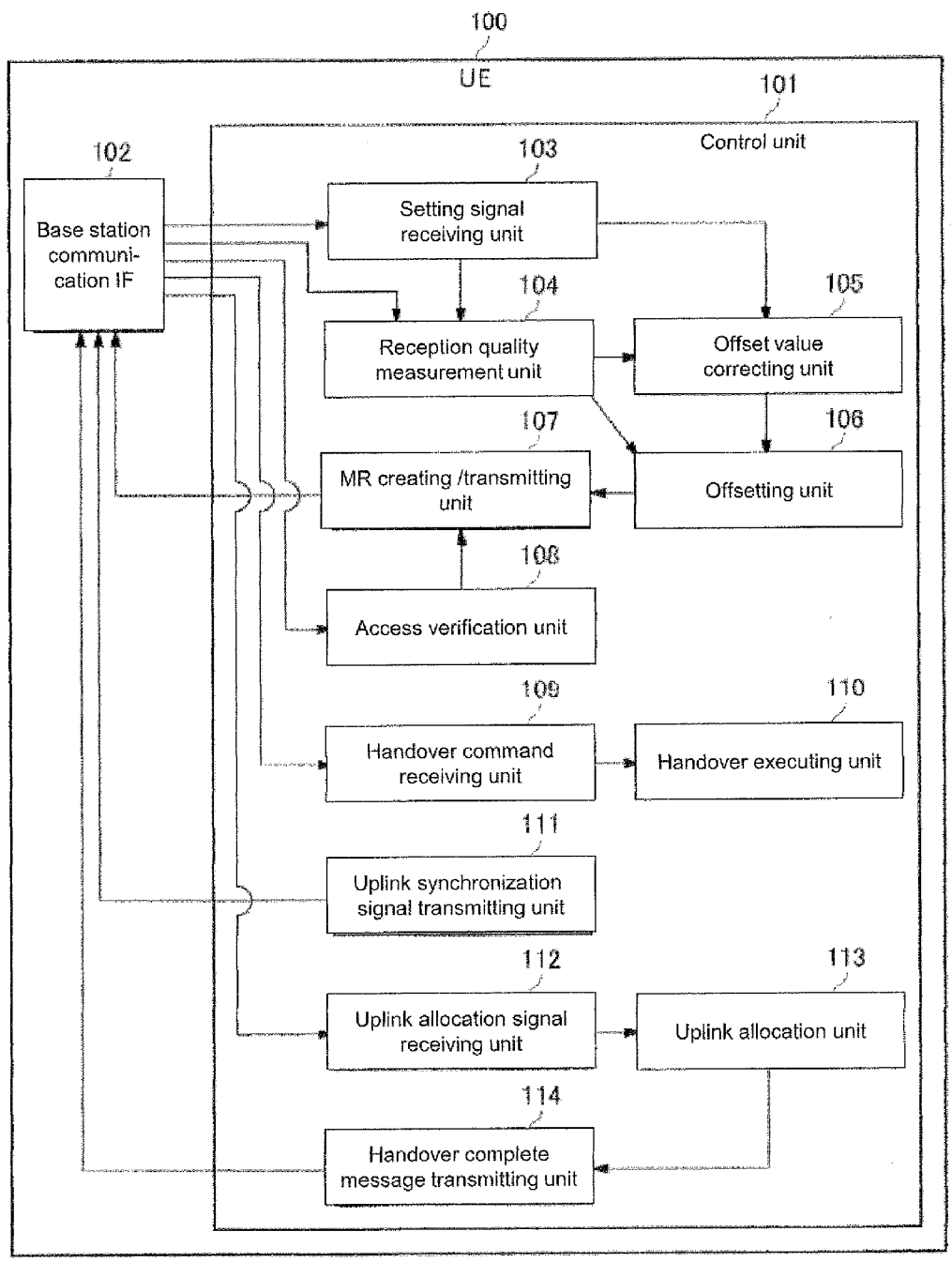
FIG. 1 is a block diagram of a user equipment according to a first embodiment.

The present invention will now be described in detail. However, the detailed description below and attached drawings are not intended to limit the present invention. Rather, the scope of the invention is defined by the attached claims.

The user equipment according to the invention is a user equipment in which a handover from a macro cell base station to a small cell base station is controlled based on a result of comparison between macro cell reception quality and small cell reception quality, the macro cell reception quality being reception quality of a signal from the macro cell base station and the small cell reception quality being reception quality of a signal from the small cell base station located in a macro cell, and the user equipment comprises: a reception quality measurement unit for measuring the macro cell reception quality and the small cell reception quality; an offsetting unit for offsetting the macro cell reception quality or the small cell reception quality with an offset value that makes the small cell reception quality relatively higher than the macro cell reception quality; and an offset value selecting unit for selecting an offset value used for offsetting among a plurality of offset values based on the macro cell reception quality.

With this configuration, in the user equipment, an offset value is corrected depending on the macro cell reception quality, and then the offset value is used for offsetting. After offsetting, the macro cell reception quality is compared with the small cell reception quality, and depending on the comparison result, the macro cell base station controls a handover of the user equipment (for example, when the small cell reception quality is higher than the macro cell reception quality, the user equipment is controlled to perform a handover).

For example, when the macro cell reception quality is higher, such as when the user equipment is located near the macro cell base station, the offset value is corrected with a small correction value. The user equipment is thus controlled to withhold from performing a handover only when the small cell reception quality is low to some extent, such as when the user equipment is located away from the small cell base station. In this way, since a handover is performed only when the user equipment is located relatively closer to the base station, the transmission power used when the user equipment transmits a signal to the base station can be suppressed to relatively low. Therefore, when the user equipment is located near the base station, interference in the uplink from the user equipment to the base station (caused by a large transmission power of the user equipment) can be suppressed. In this case, therefore, handover control can be performed with an appropriate offset value that takes into consideration interference in the uplink from the user equipment to the base station.

Meanwhile, when the macro cell reception quality is lower, such as when the user equipment is located at a cell edge of the macro cell base station, for example, the offset value is corrected with a large correction value. The user equipment is thus controlled to perform a handover even when the small cell reception quality is low to some extent, such as when the user equipment is located relatively far away from the small cell base station. In this case, since the user equipment is located away from the base station (such as a macro cell base station and a small cell base station), less interference may occur in the uplink from the user equipment to the base station even if the transmission power of the user equipment is large to some extent. In such a case, since the user equipment is controlled to perform a handover even when the user equipment is located away from the base station, probabilities of the user equipment missing an opportunity to perform a handover can be decreased. Also in this case, therefore, handover control can be performed with an appropriate offset value that takes into consideration interference in the uplink from the user equipment to the base station.

According to the present invention, it is possible to perform handover control with an appropriate offset value that takes into consideration interference in the uplink from the user equipment to the base station.

A communication system according to embodiments of the present invention will now be described below with reference to drawings. The communication system according to the embodiments includes a user equipment (UE) such as mobile phones and PDA devices, a macro cell base station (eNB) forming a macro cell, and a home base station (HeNB) forming a small cell (CSG cell) within the macro cell. The eNB corresponds to a base station device for the macro cell base station of the invention, and the HeNB corresponds to a base station device for the small cell base station of the invention.

(First Embodiment)

A communication system according to a first embodiment of the present invention will now be described below with reference to FIGS. 1 to 7. First, description will be made to a configuration of a UE according to the embodiment. FIG. 1 is a block diagram for illustrating a configuration of a UE according to the embodiment. As shown in FIG. 1, a UE 100 comprises a control unit 101 responsible for a handover-related control, and a base station communication IF 102 that is an interface (IF) for communicating with a base station (such as an eNB 200 and an HeNB 300).

The control unit 101 of the UE 100 comprises a setting signal receiving unit 103 for receiving a setting (measurement control) signal for reception quality measurement transmitted by the eNB 200, and a reception quality measurement unit 104 for measuring reception quality of signals from the base station (such as the eNB 200 and the HeNB 300).

The control unit 101 of the UE 100 also comprises an offset value correcting unit 105 for correcting an offset value with a predetermined correction value, and an offsetting unit 106 for offsetting the reception quality with the corrected offset value. In this case, the setting signal includes two correction values used to correct an offset value: a correction value α for use in the case of the proximity to the eNB 200 and a correction value β for use in the case of cell edge. Here, the setting signal receiving unit 103 corresponds to a correction value receiving unit of the invention. As described below, the offset value is set to a value that makes reception quality from a CSG cell relatively higher than reception quality from a macro cell. The offset value may be included in a setting signal transmitted from the eNB 200 or may be preset to the UE 100 as a common offset value.

The control unit 101 of the UE 100 comprises a measurement report creating/transmitting unit 107 (MR creating/transmitting unit) that has a function of creating a reception quality measurement result (measurement report) and transmitting it to a base station, and an access verification unit 108 for checking a CGI against a whitelist for access verification to the HeNB 300. The MR creating/transmitting unit 107 has a function of notifying reception quality of the eNB 200 and reception quality of an HeNB 300 that has good reception quality along with a PCI of the HeNB 300, if the reception quality of the HeNB 300 exceeds the reception quality of the eNB 200, to the eNB 200 as a reception quality measurement result. In addition to the reception quality measurement result, the MR creating/transmitting unit 107 also has a function of notifying the result of access verification along with a CGI of the HeNB 300 to the eNB 200.

The control unit 101 of the UE 100 comprises a handover command receiving unit 109 for receiving a handover command from the eNB 200, and a handover executing unit 110 for performing a handover to the HeNB 300. The UE 100 also comprises an uplink synchronization signal transmitting unit 111 for transmitting an uplink synchronization signal to the HeNB 300, and an uplink allocation signal receiving unit 112 for receiving an uplink allocation (UL allocation) signal from the HeNB 300. The UE 100 also comprises an uplink allocation unit 113 for performing uplink allocation, and a handover complete message transmitting unit 114 for transmitting a notification of handover completion (handover complete) to the HeNB 300.

Figure 2:
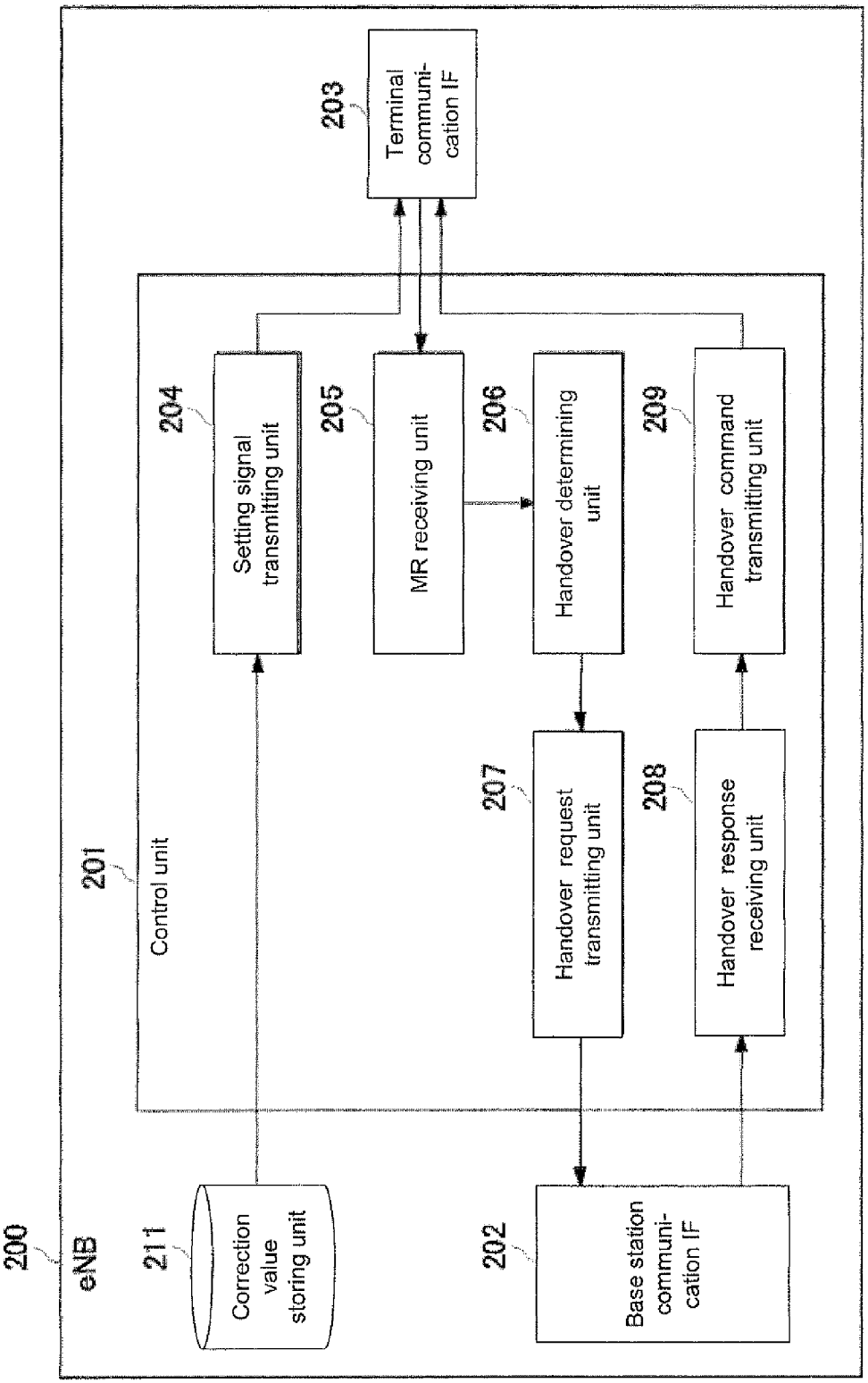
FIG. 2 is a block diagram of a macro cell base station according to the first embodiment.

Next, description will be made to a configuration of the eNB 200 according to the embodiment. FIG. 2 is a block diagram for illustrating a configuration of the eNB 200 according to the embodiment. As shown in FIG. 2, the eNB 200 comprises a control unit 201 responsible for a handover-related control, a base station communication IF 202 that is an interface for communicating with the HeNB 300, and a terminal communication IF 203 that is an interface for communicating with the UE 100.

The control unit 201 of the eNB 200 comprises a setting signal transmitting unit 204 for transmitting a setting (measurement control) signal for reception quality measurement to the UE 100, and a measurement report receiving unit 205 (MR receiving unit) for receiving a reception quality measurement result (measurement report) transmitted from the UE 100. As described above, the setting signal includes two correction values used to correct an offset value: a correction value α for use in the case of the proximity to the eNB 200 and a correction value β for use in the case of cell edge. Therefore, the setting signal transmitting unit 204 corresponds to a transmission unit of the invention. The correction values α and β to be included in the setting signal are stored in a correction value storing unit 211. The reception quality measurement result (measurement report) also includes a comparison result between reception quality from a CSG cell that has been offset with a corrected offset value and reception quality from the macro cell. Therefore, the MR receiving unit 205 corresponds to a reception unit of the invention.

The control unit 201 of the eNB 200 further comprises a handover determining unit 206 for determining whether or not a handover should be performed from the eNB 200 to the HeNB 300, and a handover request transmitting unit 207 for transmitting a handover request to the HeNB 300 when it is determined that a handover is to be performed. The handover determining unit 206 determines whether a handover should be performed based on a comparison result between reception quality from a CSG cell and reception quality from the macro cell. Therefore, the handover determining unit 206 corresponds to a determination unit of the invention.

The handover determining unit 206 has a function of determining whether or not the reception quality from the macro cell is lower than a predetermined threshold value T1 based on a measurement report received from the UE 100, when it is determined that the handover of the UE 100 is to be performed. Therefore, the handover determining unit 206 also corresponds to a second determination unit of the invention. Additionally, although not required, the handover request transmitting unit 207 transmits, along with the handover request, a control signal that causes the HeNB 300 to increase its transmission power when it is determined that the reception quality from the macro cell is lower than the predetermined threshold value T1. Therefore, it follows that the handover request transmitting unit 207 corresponds to a second transmission unit of the invention.

The control unit 201 of the eNB 200 comprises a handover response receiving unit 208 for receiving a response to the handover request (handover response) from the HeNB 300, and a handover command transmitting unit 209 for transmitting a handover command based on the handover response to the UE 100.

Figure 3:
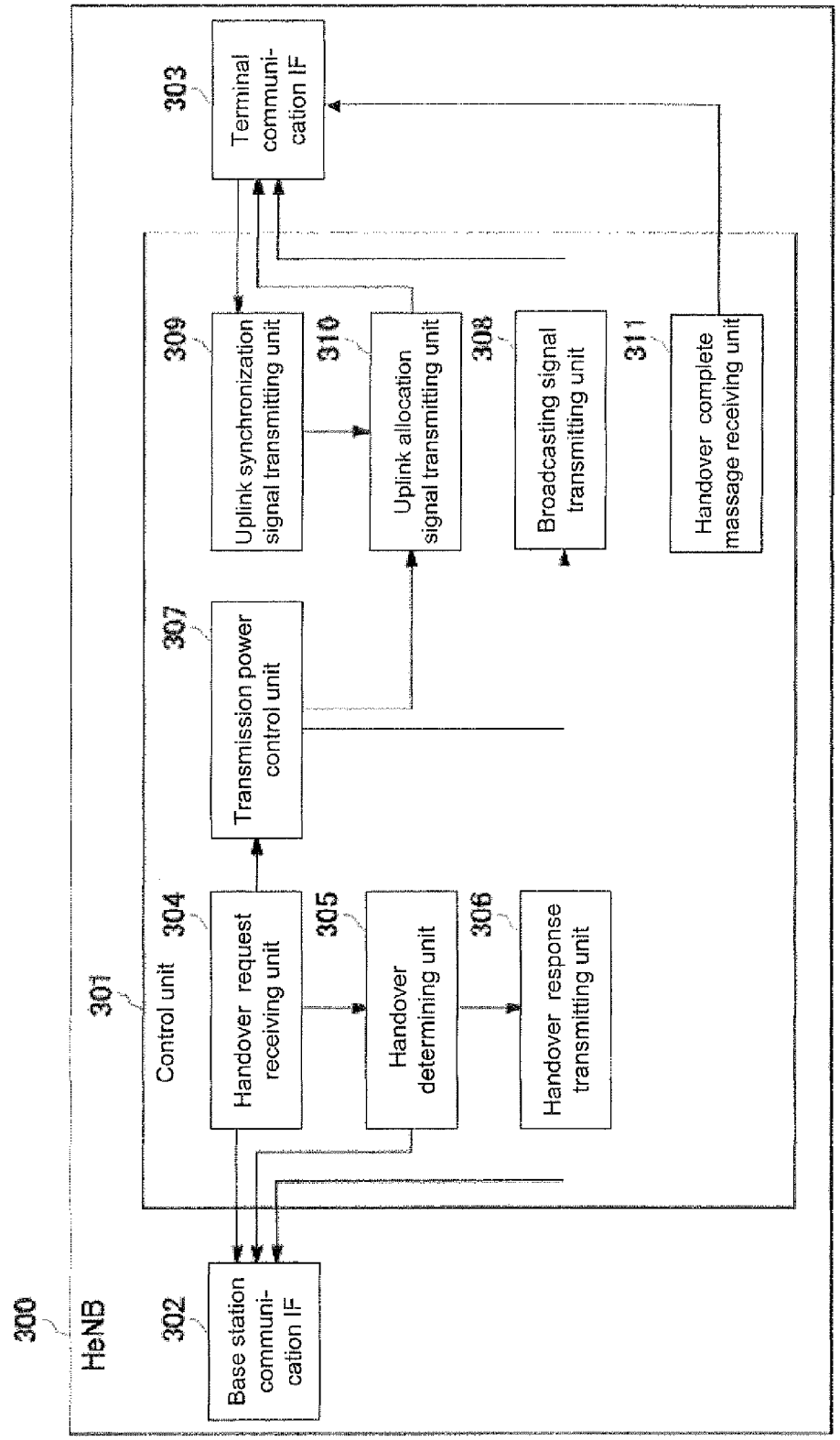
FIG. 3 is a block diagram of a CSG cell according to the first embodiment

Description will now be made to a configuration of an HeNB 300 according to the embodiment. FIG. 3 is a block diagram for illustrating a configuration of the HeNB 300 according to the embodiment. As shown in FIG. 3, the HeNB 300 comprises a control unit 301 responsible for a handover-related control, a base station communication IF 302 that is an interface for communicating with the eNB 200, and a terminal communication IF 303 that is an interface for communicating with the UB 100.

The control unit 301 of the HeNB 300 comprises a handover request receiving unit 304 for receiving a handover request from the eNB 200, a handover determining unit 305 for determining whether or not a handover should be performed based on the handover request, and a handover response transmitting unit 306 for transmitting a response to the handover request (handover response) to the eNB 200.

Additionally, although not required, the control unit 301 of the HeNB 300 comprises a transmission power controlling unit 307 for controlling transmission power. As described above, when it is determined that the reception quality from the macro cell is lower than the predetermined threshold value T1, a control signal that causes the HeNB 300 to increase its transmission power is transmitted along with the handover request from the eNB 200 to the HeNB 300. The transmission power controlling unit 307 controls the transmission power to increase based on the control signal transmitted along with the handover request. Thereafter, the transmission power controlling unit 307 controls the transmission power to be restored once a predetermined time (time-out point) expires.

The control unit 301 of the HeNB 300 further comprises a broadcasting signal transmitting unit 308 for transmitting a broadcasting signal to the UE 100. The control unit 301 also comprises an uplink synchronization signal receiving unit 309 for receiving an uplink synchronization signal from the UE 100, an uplink allocation signal transmitting unit 310 for transmitting an uplink allocation (UL allocation) signal to the UE 100, and a handover complete message receiving unit 311 for receiving a notification of handover completion (handover complete) from the UE 100.

The operation of a thus configured communication system will be described with reference to drawings.

Here, the description will mainly be made to a characteristic operation of the invention. The key operation of the invention is to correct an offset value used to compare reception quality of a nearby HeNB 300 from the UE 100 with that of the eNB 200 when the UE 100 is located near the eNB 200. Furthermore in this embodiment, although not required, the transmission power of the HeNB 300 can be controlled to temporarily increase after the UE 100 is handed over to the HeNB 300.

Figure 4:
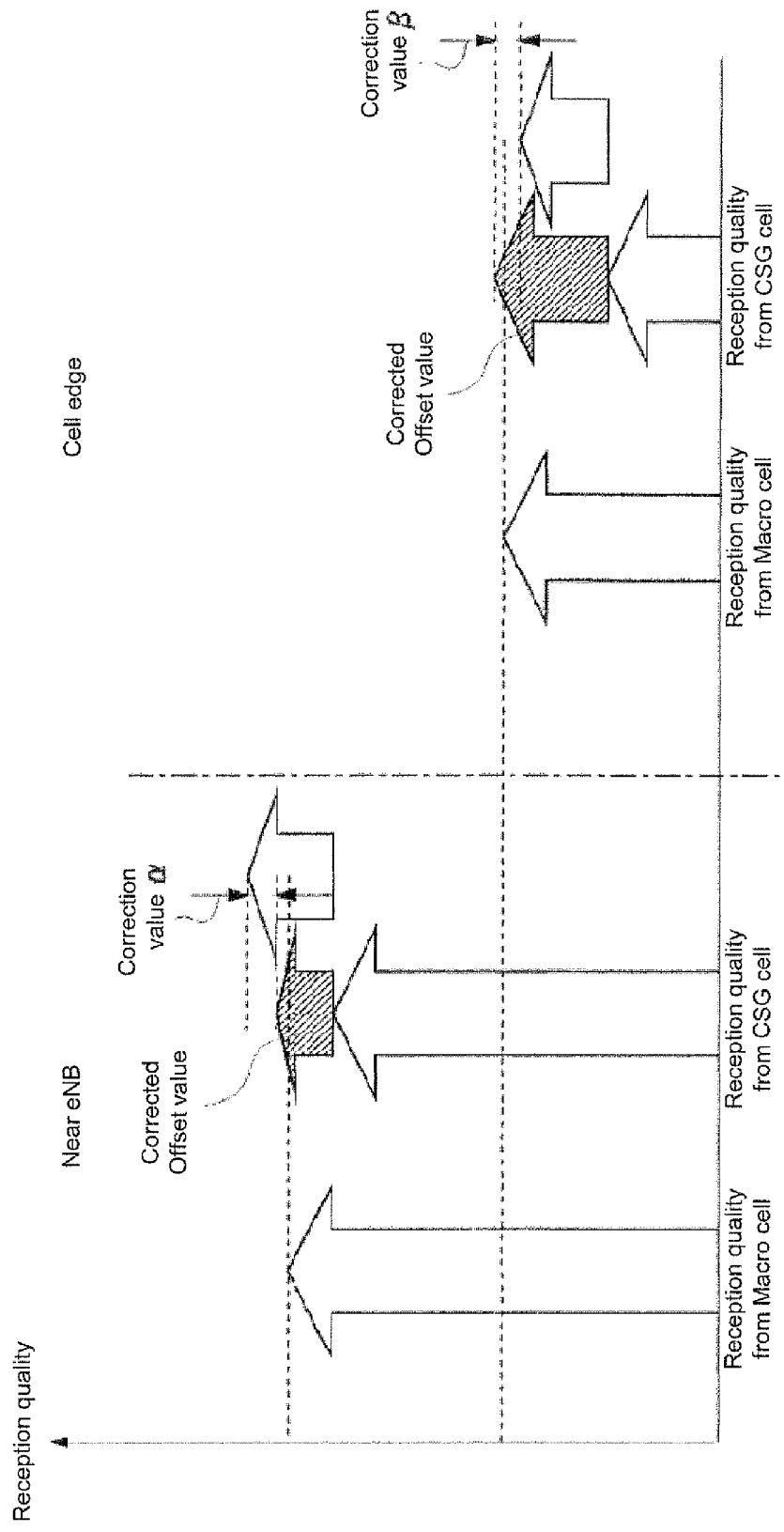
FIG. 4 is a diagram for illustrating an offset value correction according to the first embodiment.

First, description will be made to an offset value correction with reference to FIGS. 4 and 5. FIG. 4 is a diagram for illustrating an offset value correction according to the embodiment. As shown in FIG. 4, when the UE 100 is located near the eNB 200, the offset value is corrected to a lower value. In the example shown in FIG. 4, a correction value α ($\alpha<0$) is added to the offset value. On the other hand, when the UE 100 is located at a cell edge, the offset value is corrected to a larger value. In the example shown in FIG. 4, a correction value β ($\beta>0$) is added to the offset value. The offset value correction is performed in the offset value correcting unit 105 in the UE 100.

Figure 5:
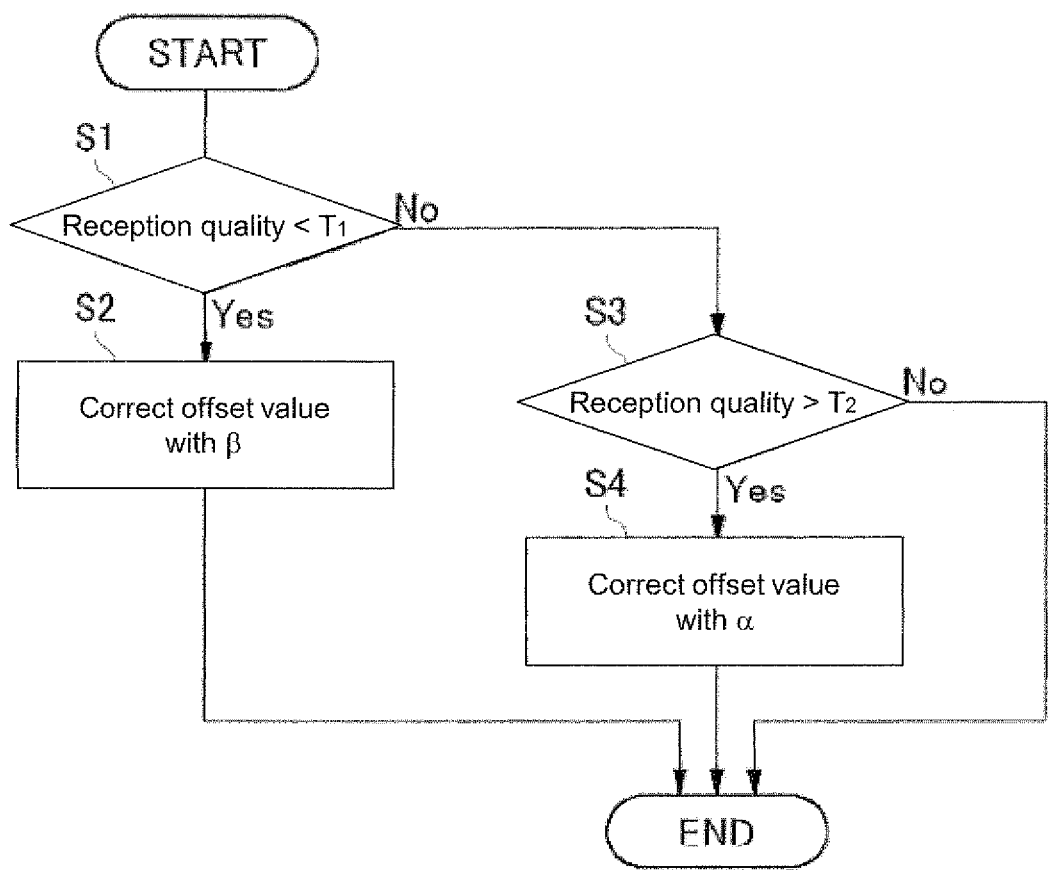
FIG. 5 is a flow chart of correcting an offset value in the first embodiment.

FIG. 5 is a flow chart of an operation of the offset value correcting unit 105 (offset value correction). As shown in FIG. 5, the offset value correcting unit 105 first determines whether or not reception quality of the eNB 200 is lower than a predetermined threshold value T1 (S1). If the reception quality of the eNB 200 is lower than the threshold value T1, the offset value is corrected with the correction value β (S2). On the other hand, if the reception quality of the eNB 200 is not lower than the predetermined threshold value T1, then a determination is made whether or not the reception quality of the eNB 200 exceeds a predetermined threshold value T2 (S3). If the reception quality of the eNB 200 exceeds the threshold value T2, the offset value is corrected with the correction value α (S4). Although description has been made to the case of a correction value $\alpha<0$ and a correction value $\beta>0$, the scope of the invention is not limited thereto and any correction value satisfying a condition of $\alpha<\beta$ may be used. In addition, the threshold values T1 and T2 may be the same (T1=T2).

In this embodiment, description has been made to the case of using two correction values α and β to correct the offset value. However, the eNB 200 may notify two previously corrected offset values (a correction value α for use in the case of the proximity to the eNB 200 and a correction value β for use in the case of cell edge), one of which may be selected depending on the reception quality of the eNB 200.

Figure 6:
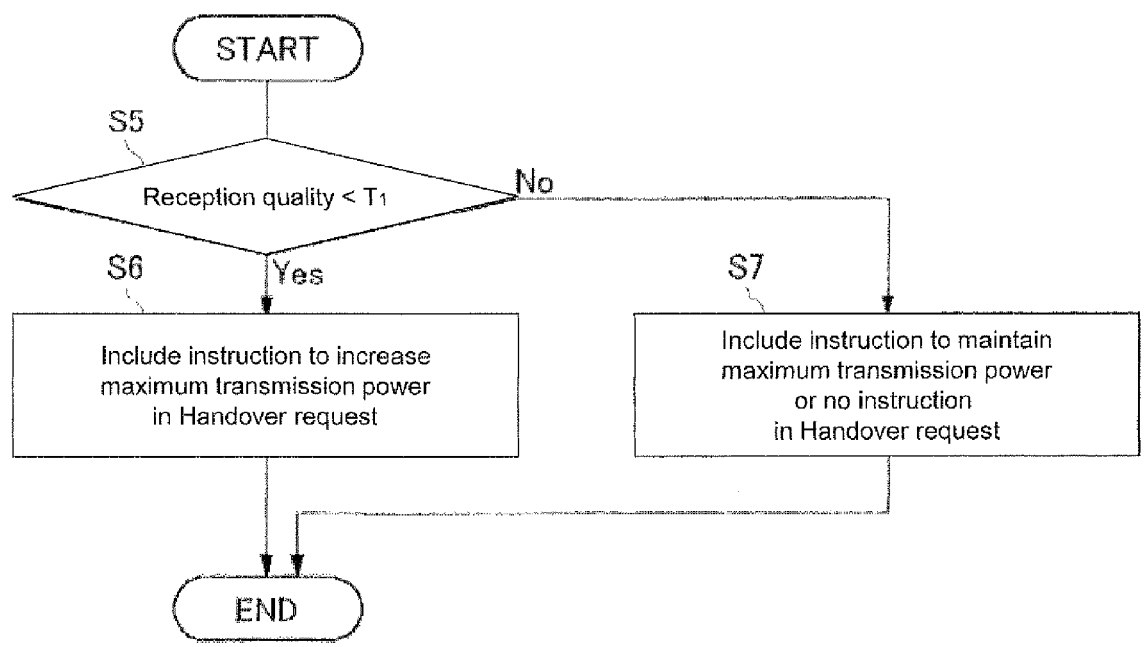
FIG. 6 is a flow chart of determining whether or not transmission power should temporarily be increased in the first embodiment.

In this embodiment, additionally, although not required, transmission power of the HeNB 300 may temporarily be increase. Description will be made to an operation in the case of temporarily increasing transmission power of the HeNB 300 with reference to FIG. 6. The handover determining unit 206 determines whether or not the transmission power should be increased. FIG. 6 is a flow chart of an operation of the handover determining unit 206 in the eNB 200 (determination of whether or not transmission power should temporarily be increased). As shown in FIG. 6, the handover determining unit 206 determines whether or not reception quality of the eNB 200 is lower than a threshold value T1 based on a measurement report received from the UE 100 (S5). When it is determined that the reception quality of the eNB 200 is lower than the threshold value T1, an instruction that causes the HeNB 300 to increase the maximum transmission power is included in a handover request transmitted to the HeNB 300 (S6). On the other hand, when it is determined that the reception quality of the eNB 200 is not lower than the threshold value T1, an instruction that causes the HeNB 300 to still maintain the maximum transmission power is included, or no instruction that causes the HeNB 300 to increase the maximum transmission power is included, in a handover request transmitted to the eNB 300 (S7).

Upon receiving the handover request from the eNB 200, the HeNB 300 temporarily changes the maximum transmission power according to the maximum transmission power instruction. This temporarily increases the maximum transmission power of the HeNB 300 in connection with the UE 100 located at a macro cell edge, and enables the UE 100, which is located relatively far away from the cell edge of the HeNB 300, to receive a DL signal of the HeNB 300. Here, it is assumed that the duration in which the maximum transmission power is temporarily increased (i.e. timer) can be set by each HeNB 300. Once the timer expires, the HeNB 300 restores the maximum transmission power.

Methods for measuring nearby base stations include intra-frequency measurement in which base stations of the same frequency as the eNB 200 are measured and inter-frequency measurement in which base station of different frequency from the eNB 200 are measured. In inter-frequency measurement for a CSG cell that has a service bandwidth different from that of a macro cell outside a service bandwidth of the macro cell, there is no interference between the eNB 200 and a measured nearby base station because of the frequency difference. Accordingly, it is not necessary to correct an offset value depending on the location of the UE 100, therefore reception quality of the eNB. In cases where the UE 100 performs only the inter-frequency measurement, therefore, no offset correction value may be included in a measurement control signal to prevent the UE 100 from correcting an offset value, and although not required, even the use of a handover request to control the maximum transmission power of the HeNB 300 may be omitted.

Figure 7:
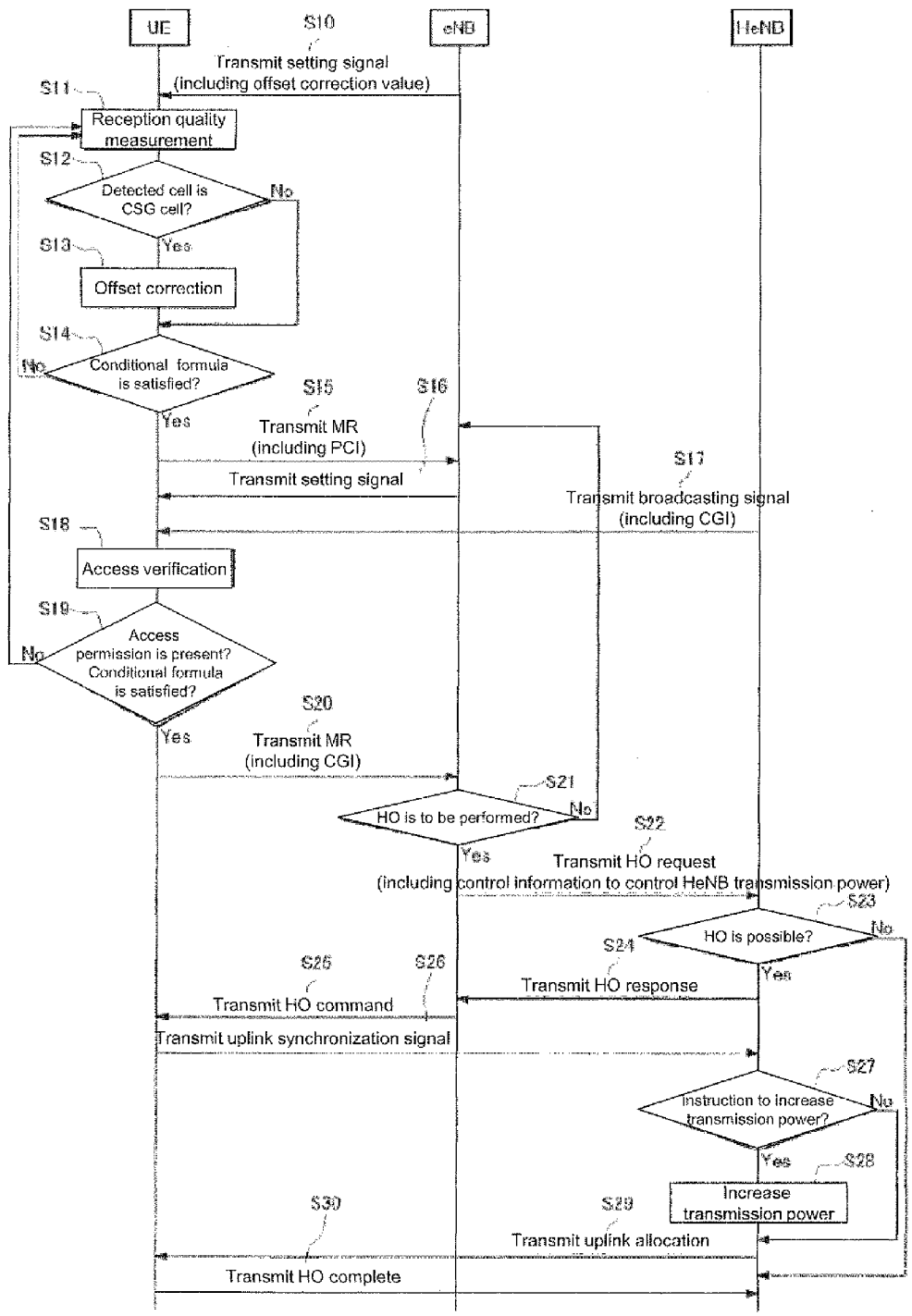
FIG. 7 is a sequence diagram for illustrating an operation of the communication system according to the first embodiment.

Next, description will be made to an operation of the entire communication system at the time of handover control. FIG. 7 is a sequence diagram for illustrating an operation of the communication system according to the embodiment. As shown in FIG. 7, the eNB 200 first transmits a setting (measurement control) signal necessary for reception quality measurement to the UE 100 (S10). In this case, the setting signal transmitted from the eNB 200 includes information such as an offset value, correction values α and β, and a threshold value.

The UE 100 measures reception quality of signals from nearby base stations (eNB 200 and HeNB 300) based on the setting signal (S11). In this measurement, PGIs of eNBs 200 and HeNBs 300 located around the UE are detected. The UE 100 also distinguishes whether the detected base station is an eNB 200 or an HeNB 300 based on the PCIs (S12). If the detected base station is an HeNB 300, then the offset value is corrected (S13), the corrected offset value is used to offset reception quality of the HeNB 300, and a determination is made whether or not the offset reception quality of the HeNB 300 exceeds reception quality of the eNB 200 (S14). If the reception quality of the HeNB 300 exceeds the reception quality of the eNB 200, the UE 100 notifies the eNB 200 of the reception quality of the eNB 200 and that of the HeNB 300 along with the PCI of the HeNB 300 as a measurement result notifying signal (measurement report) (S15).

If the UE 100 retains fingerprints, the UE 100 can select only accessible HeNBs 300 and notify them to the eNB 200 in a measurement report because it is possible to distinguish whether the detected HeNBs 300 are base stations accessible to the UE 100.

Subsequently, the eNB 200 transmits setting information (measurement configuration) necessary for access verification to the UE 100 (S16). The UE 100 receives a CGI by means of system information transmitted from the HeNB 300 (S17), checks the CGI against the whitelist retained by the UE 100 for access verification (S18), and then determines whether the HeNB 300 is accessible and reception quality of the HeNB 300 exceeds reception quality of the eNB 200 (S19).

The UE 100 then transmits a result notification of the access verification (measurement report) to the eNB 200 (S20). In this case, the measurement report notifies the result of the reception quality remeasurement of the HeNB 300 along with the CGI of the HeNB 300.

Based on the measurement report received from the UE 100, the eNB 200 determines whether or not the UE 100 should be handed over to the HeNB 300 (S21). When it is determined that the handover should be performed, the eNB 200 transmits a handover request to the HeNB 300 (S22). In this ease, the eNB 200 transmits the handover request to a base station of handover destination (the HeNB 300) via an HeNBGW, which is an access gateway, or MME. Although not required, the handover request includes control information used to control the maximum transmission power of the HeNB 300 depending on reception quality of the eNB 200.

When the HeNB 300 that receives the handover request determines that the handover of the UE 100 may be allowed (S23), the HeNB 300 transmits a handover response signal to the eNB 200 via HeNBGW or MME (S24). Upon receiving the handover response, the eNB 200 transmits a handover command signal to the UE 100 (S25). The handover command includes an identification of the UE 100 for the HeNB 300 (C-RNTI) and information necessary for the UE 100 to perform uplink synchronization. Upon receiving the handover command, the UE 100 transmits an uplink synchronization signal to the HeNB 300 (S26).

Additionally, although not required, the HeNB 300 determines whether or not an instruction that causes the HeNB 300 to increase the transmission power is included in a handover request (S27). If the instruction that causes the HeNB 300 to increase the transmission power is included, the transmission power is controlled to temporarily increase based on the instruction (S28). The HeNB 300 then performs uplink allocation for the UE 100 and notifies the allocation information to the UE 100 (S29). Once the UE 100 is successfully connected to the HeNB 300, then the UE 100 transmits a handover confirmation signal to the HeNB 300 (S30) notifying that the handover has been completed in the UE 100.

According to the communication system according to the first embodiment of the invention, handover control can be performed with an appropriate offset value that takes into consideration interference in the uplink from the UE 100 to the base station.

In this embodiment, in the UE 100, an offset value is corrected depending on reception quality from a macro cell, and then the offset value is used for offsetting. After offsetting, the reception quality from the macro cell is compared with that from a CSG cell, and depending on the comparison result, the eNB 200 controls a handover of the UE 100. Specifically, when the small cell reception quality is higher than the CSG cell reception quality, the UE 100 is controlled to perform a handover.

For example, when the macro cell reception quality is higher, such as when the UE 100 is located near the eNB 200, the offset value is corrected with a small correction value α. The UE 100 is thus controlled to withhold from performing a handover when the CSG cell reception quality is low to some extent, such as when the UE 100 is located away from the HeNB 300. In this way, a handover is performed only when the UE 100 is located relatively closer to the base station. In this way, the transmission power used when the UE 100 transmits a signal to the base station can be suppressed to relatively low. Therefore, when the UE 100 is located near the base station, interference in the uplink from the UE 100 to the base station caused by a large transmission power of the UE 100 can be suppressed. Therefore, handover control can be performed with an appropriate offset value that takes into consideration interference in the uplink from the UE 100 to the base station.

Meanwhile, when the reception quality of the macro cell is lower, such as when the UE 100 is located at a cell edge, for example, the offset value is corrected with a large correction value β. The UE 100 is thus controlled to perform a handover even when the reception quality from the CSG cell is low to some extent, such as when the UE 100 is located relatively far away from the HeNB 300. In this case, since the UE 100 is located away from the base station (such as the eNB 200 and the HeNB 300), less interference may occur in the uplink from the UE 100 to the base station even if the transmission power of the UE 100 is large to some extent. In such a case, since the UE 100 is controlled to perform a handover even when the UE 100 is located away from the base station, probabilities of the UE 100 missing an opportunity to perform a handover can be decreased. Therefore, handover control can be performed with an appropriate offset value that takes into consideration interference in the uplink from the UE 100 to the base station.

In this embodiment, the offset value is corrected with a correction value α for use in the case of the proximity to the base station (a first correction value) or a correction value β for use in the case of cell edge (a second correction value). These correction values α and β (the first correction value and the second correction value) are transmitted from the eNB 200 to the UE 100. In the UE 100, when the reception quality from the macro cell is higher (above a threshold value T2), the offset value is corrected with a correction value α, and when the reception quality from the macro cell is lower (below a threshold value T1), the offset value is corrected with correction value β. In this way, handover control can be performed with an appropriate offset value that takes into consideration interference in the uplink from the UE 100 to the base station.

In this embodiment, a setting signal for reception quality measurement can be used to deliver the correction values α and β (the first correction value and the second correction value) from the eNB 200 to the UE 100. Therefore, it is not necessary to provide another signaling for notifying a correction value. In addition, since the setting signal is transmitted separately to each UE 100, it is possible to set correction values α and β for each UE 100.

(Second Embodiment)

A communication system according to a second embodiment of the present invention will now be described below with reference to FIGS. 8 to 10. Here, description will primarily be made to differences of the embodiment from the first embodiment. The configuration and operation of the second embodiment are similar to those of the first embodiment unless otherwise noted.

This embodiment is configured to notify correction values α and β and a threshold value by means of a broadcasting signal transmitted from the eNB 200, which is different from the first embodiment in which the correction values α and β and the threshold value are notified by means of a measurement control signal transmitted from the eNB 200 separately to the UE 100.

Figure 8:
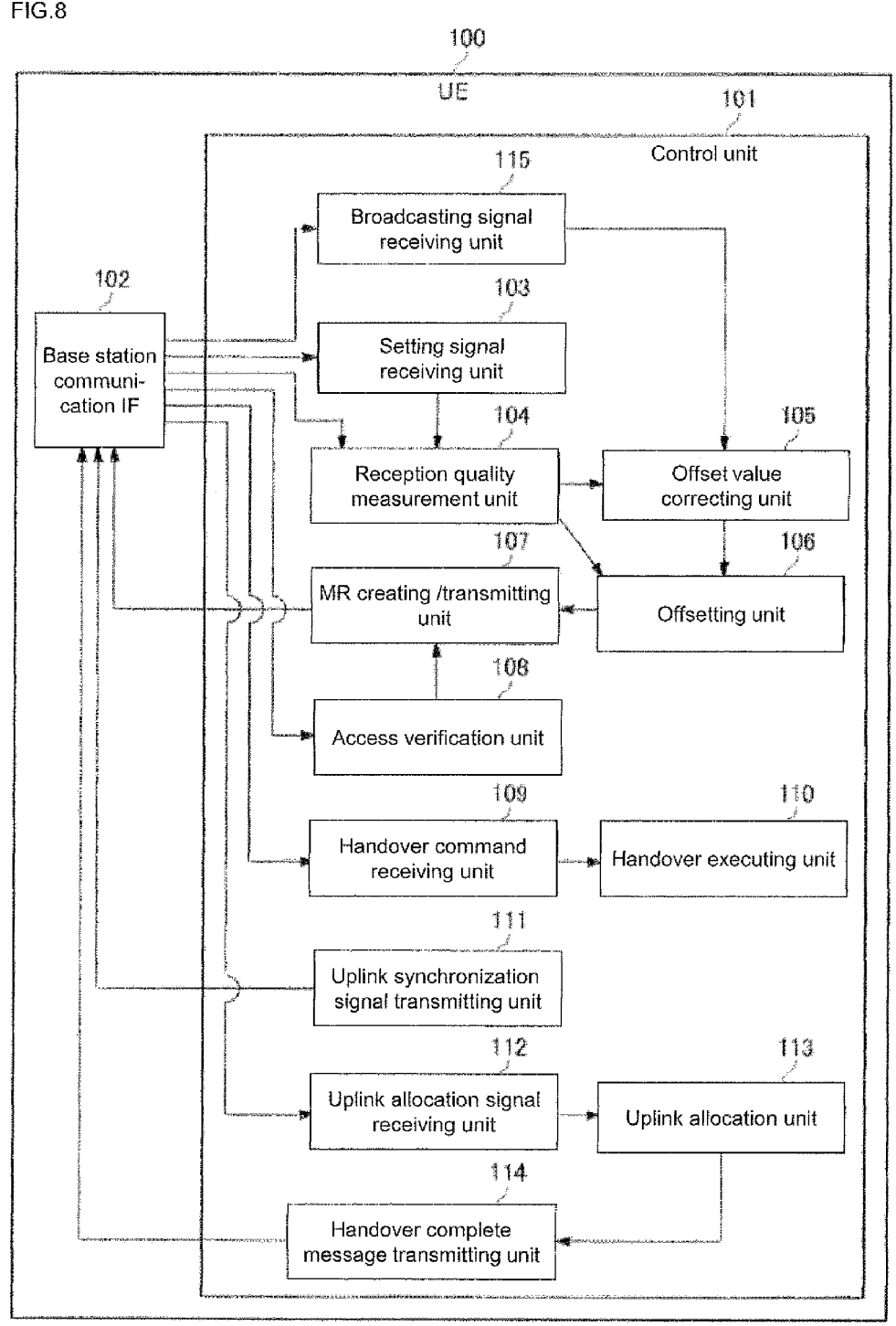
FIG. 8 is a block diagram of a user equipment according to a second embodiment.

FIG. 8 is a block diagram for illustrating a configuration of the UE 100 according to the embodiment. As shown in FIG. 8, in addition to the configuration of the first embodiment, the UE 100 according to the embodiment has a broadcasting signal receiving unit 115 for receiving a broadcasting signal transmitted from the eNB 200.

Figure 9:
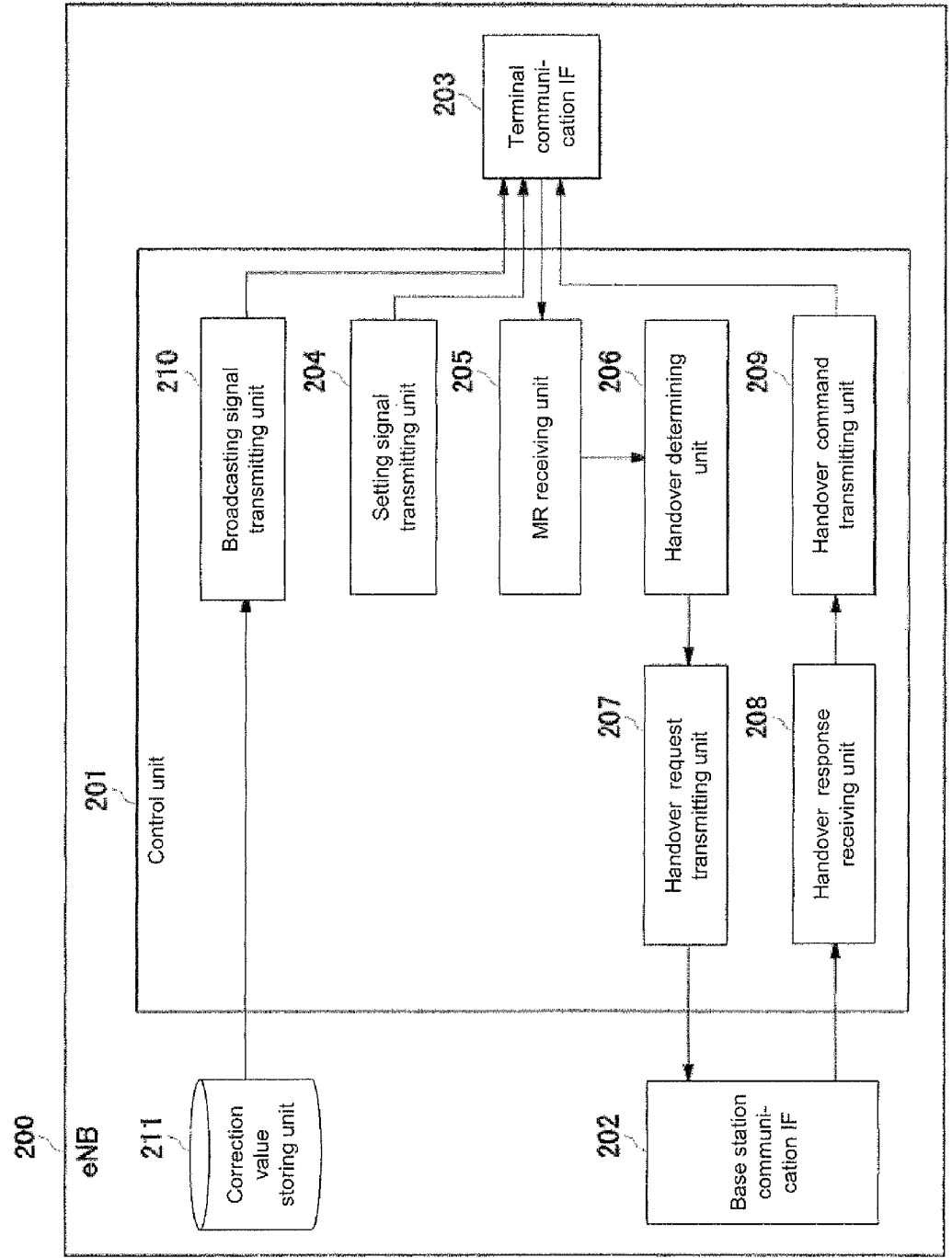
FIG. 9 is a block diagram of a macro cell base station according to the second embodiment.

Further, FIG. 9 is a block diagram for illustrating a configuration of the eNB 200 according to the embodiment. As shown in FIG. 9, in addition to the configuration of the first embodiment, the eNB 200 according to the embodiment has a broadcasting signal transmitting unit 210 for transmitting a broadcasting signal to the UE 100. The correction values α and β to be included in the broadcasting signal are stored in a correction value storing unit 211.

The operation of a thus configured communication system will be described with reference to drawings. Similarly, description will primarily be made to differences in the operation of the communication system from that of the first embodiment.

Figure 10:
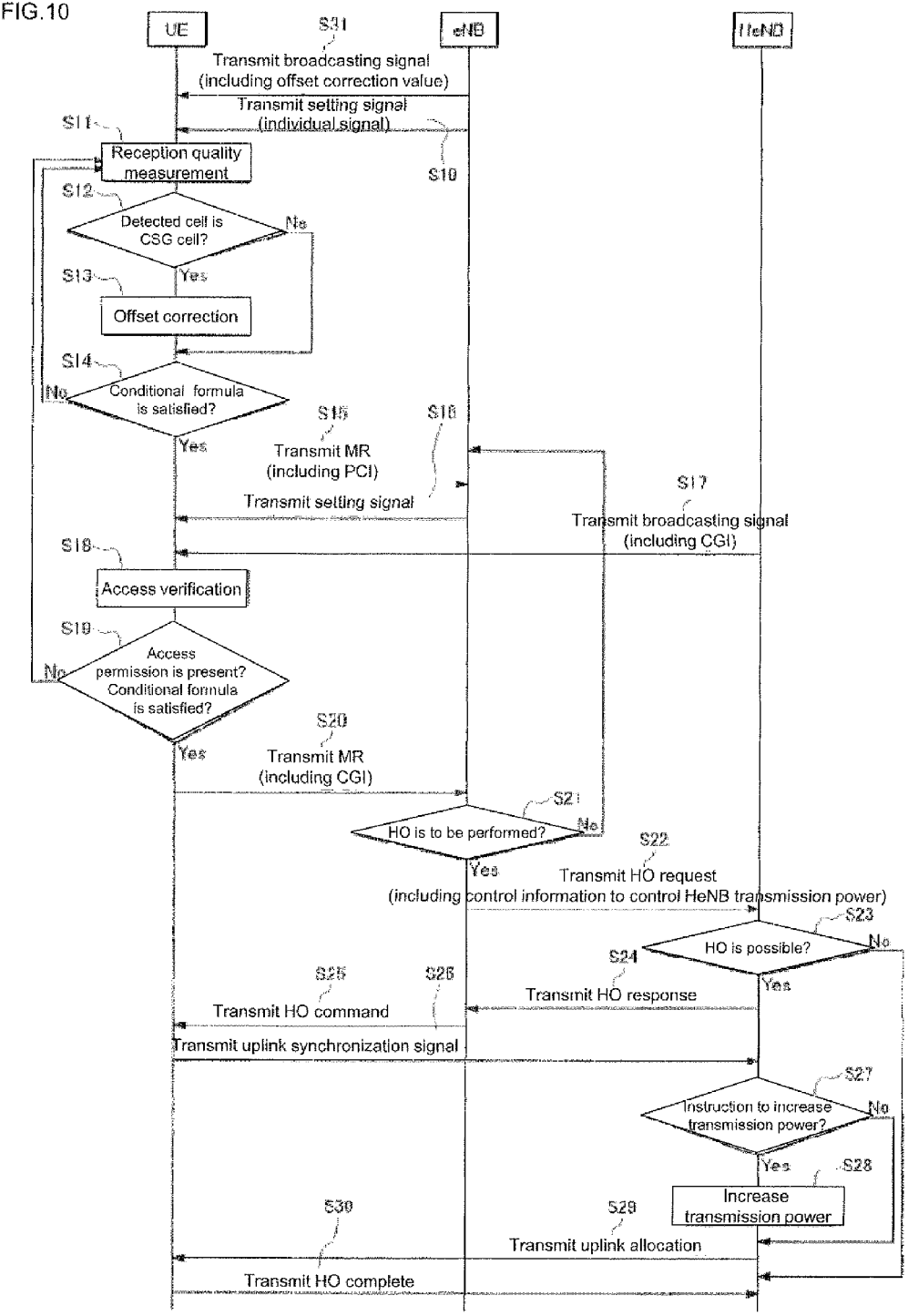
FIG. 10 is a sequence diagram for illustrating an operation of the communication system according to the second embodiment.

FIG. 10 is a sequence diagram for illustrating an operation of the communication system according to the embodiment. In this case, as shown in FIG. 10, correction values α and β and a threshold value are notified by means of a broadcasting signal from the eNB 200 to all UEs 100 in the macro cell (S31). The UE 100 therefore receives a broadcasting signal broadcast from the macro cell to acquire the correction values α and β and the threshold value. In this case, a setting signal transmitted separately to the UE 100 does not include information of the correction values α and β or the threshold value.

According to the wireless communication system according to the second embodiment, similar effects to the first embodiment can be achieved.

In this embodiment, the broadcasting signal can be used to deliver the correction values (the first correction value and the second correction value) from the eNB 200 to the UE 100. Therefore, it is not necessary to provide another signaling for notifying a correction value. In addition, since a setting signal for reception quality measurement is not used, it is not necessary to increase the amount of information in the setting signal.

(Third Embodiment)

A communication system according to a third embodiment of the present invention will now be described below with reference to FIGS. 11 to 13. Here, description will primarily be made to differences of the embodiment from the first embodiment. The configuration and operation of the third embodiment are similar to those of the first embodiment unless otherwise noted.

This embodiment is configured to notify correction values α and β and a threshold value by means of a broadcasting signal transmitted from each HeNB 300, which is different from the first embodiment in which the correction values α and β and a threshold value are notified by means of a measurement control signal transmitted from the eNB 200 separately to the UE 100.

Figure 11:
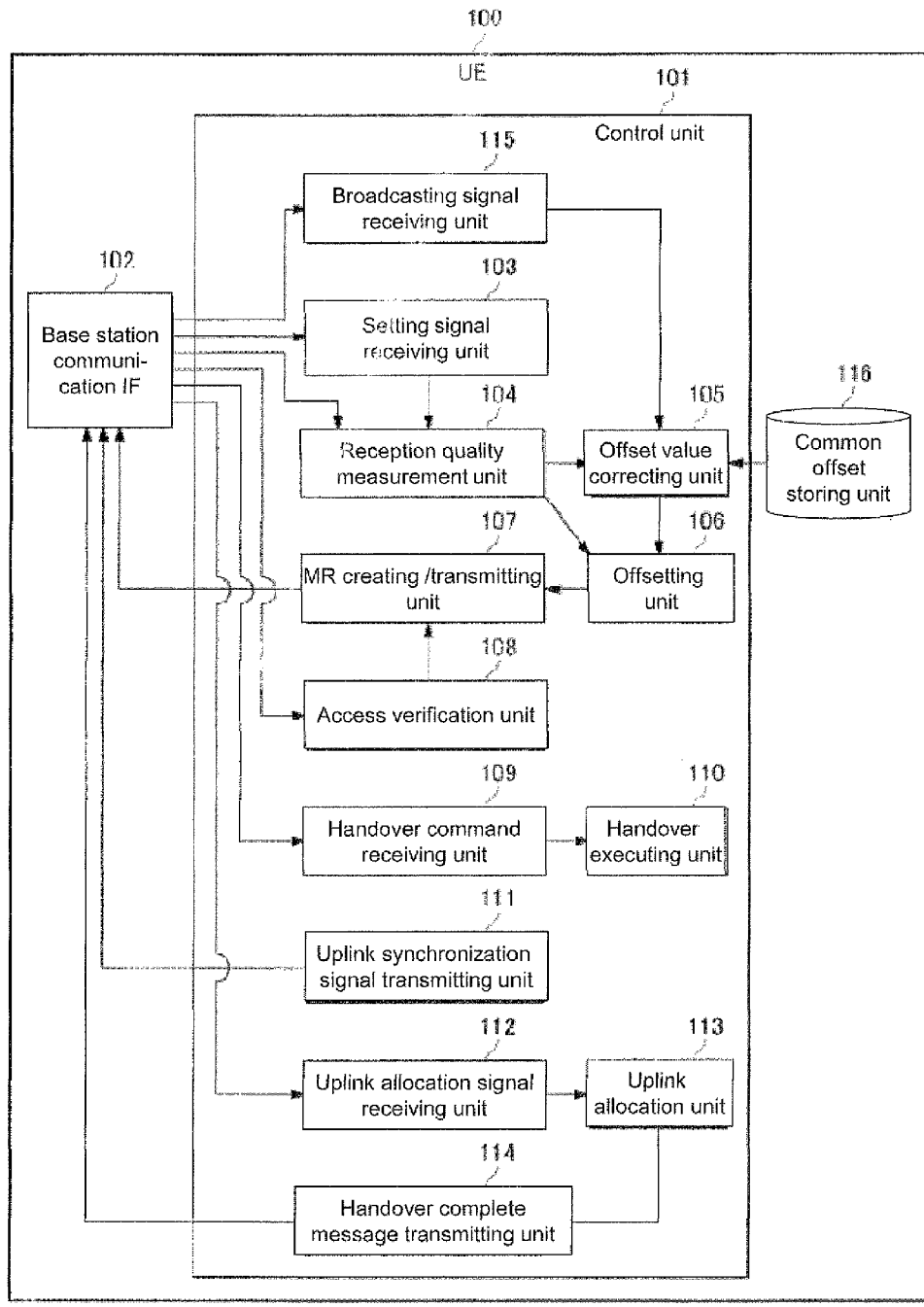
FIG. 11 is a block diagram of a user equipment according to a third embodiment.

FIG. 11 is a block diagram for illustrating a configuration of the UE 100 according to the embodiment. As shown in FIG. 11, in addition to the configuration of the first embodiment, the UE 100 according to the embodiment has a broadcasting signal receiving unit 115 for receiving a broadcasting signal transmitted from each HeNB 300, and a common offset storing unit 116 for storing a common offset value in the macro cell.

Figure 12:
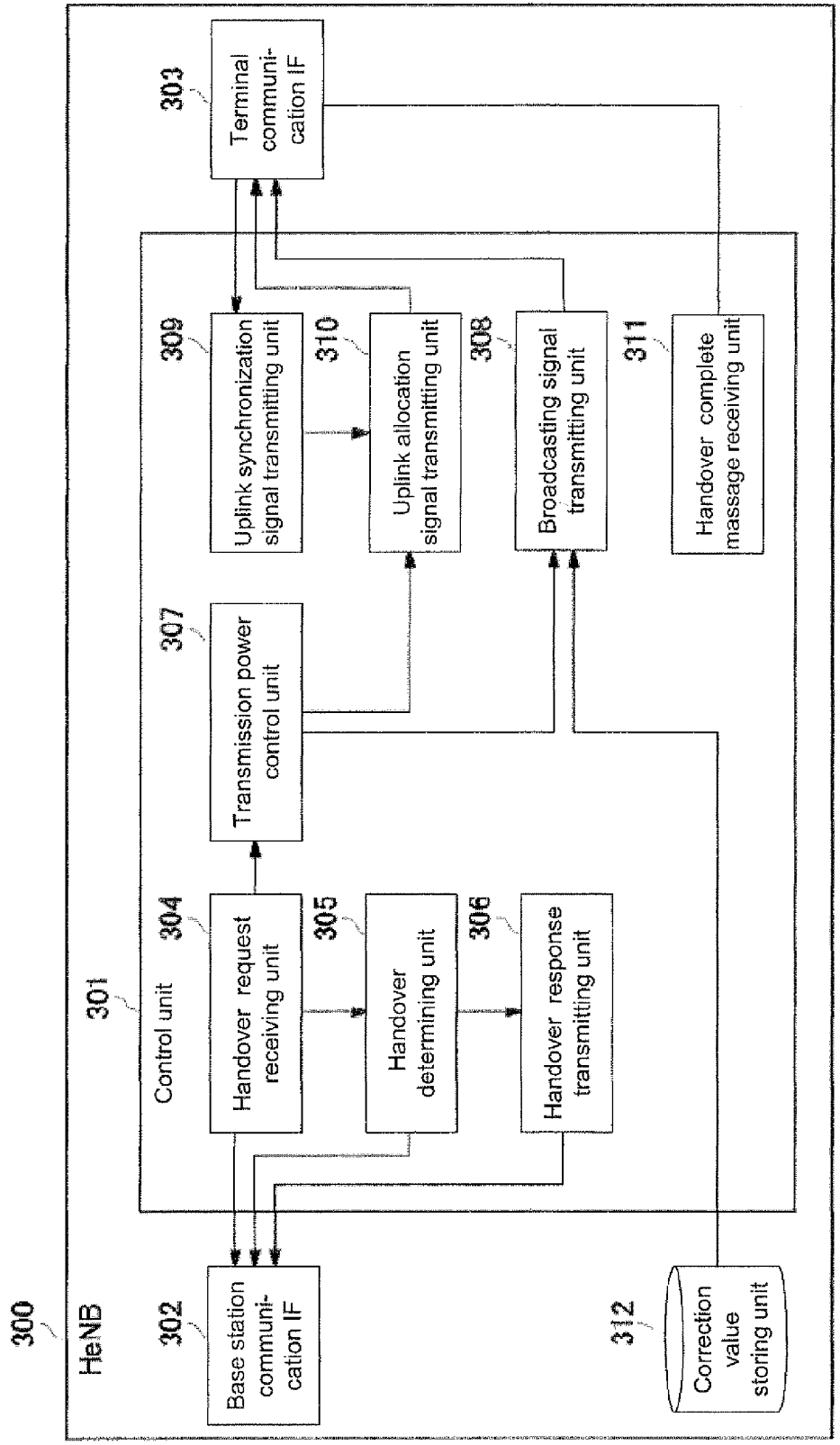
FIG. 12 is a block diagram of a CSG cell according to the third embodiment.

FIG. 12 is a block diagram for illustrating a configuration of the HeNB 300 according to the embodiment. As shown in FIG. 12, in addition to the configuration of the first embodiment, the UE 100 according to the embodiment has a correction value storing unit 312 for storing a correction value set for each HeNB 300.

The correction value stored in the correction value storing unit 312 (i.e. a correction value to be included in a broadcasting signal by the HeNB 300) is set depending on the location of the HeNB 300 in the macro cell. For example, (1) when the HeNB 300 is located near the eNB 200, a small correction value α is stored, and (2) when the HeNB 300 is located at a macro cell edge, a large correction value β is stored. In addition, (3) when the HeNB 300 is located in the middle between the cases (1) and (2), the embodiment is configured to either include no correction value or include a correction value 0 in the broadcasting signal.

The operation of a thus configured communication system will be described with reference to drawings. Similarly, description will primarily be made to differences in the operation of the communication system from that of the first embodiment.

Figure 13:
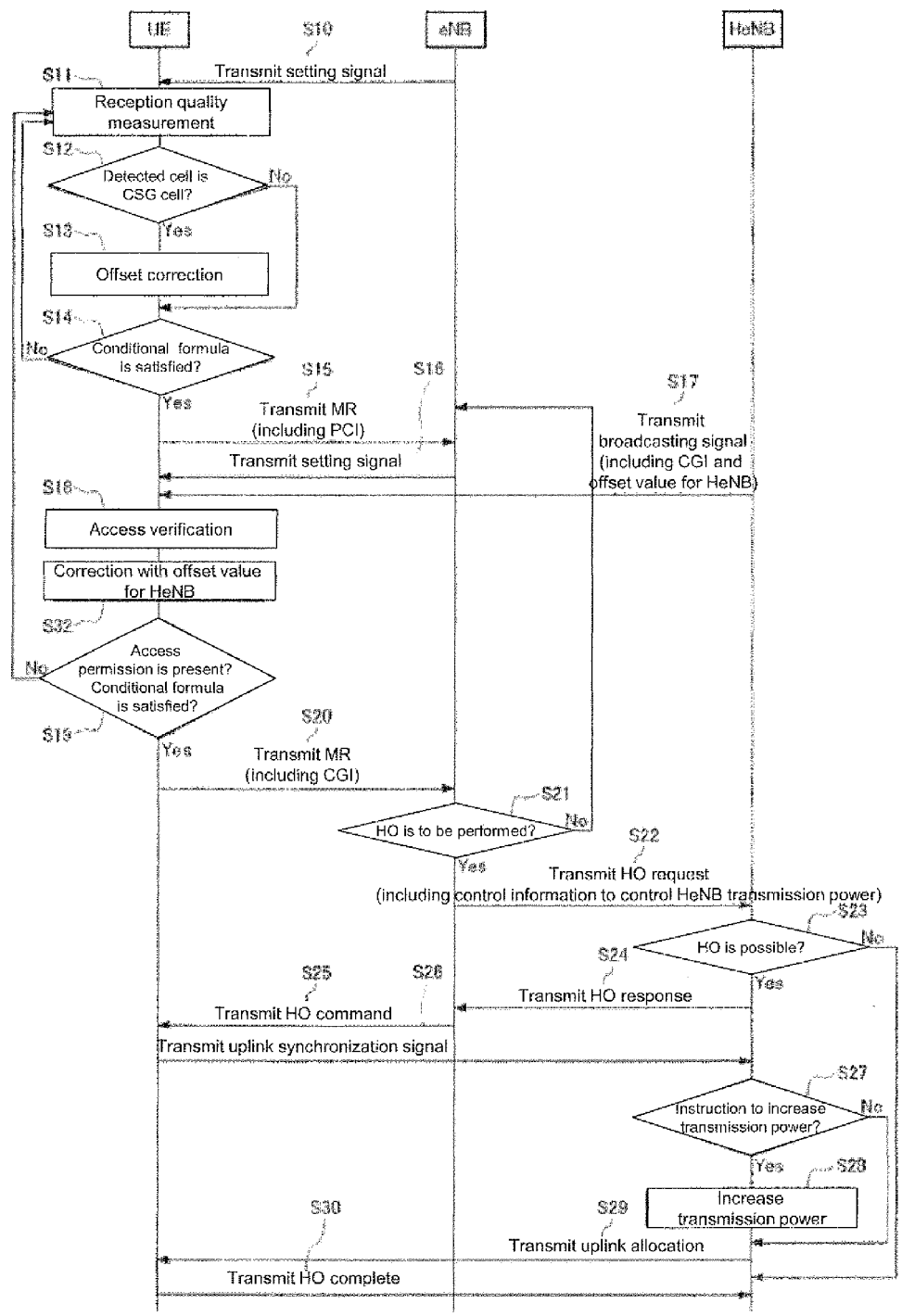
FIG. 13 is a sequence diagram for illustrating an operation of the communication system according to the third embodiment.

FIG. 13 is a sequence diagram for illustrating an operation of the communication system according to the embodiment. In this case, as shown in FIG. 13, until a correction value set for each HeNB 300 is delivered by means of system information transmitted from the HeNB 300, the common offset value is corrected (S13), the corrected common offset value is used to offset reception quality of the HeNB 300, and a determination is made whether or not the offset reception quality of the HeNB 300 exceeds reception quality of the eNB 200 (S14).

When a correction value set for each HeNB 300 is delivered by means of system information transmitted from the HeNB 300 (S17), the offset value corrected with the correction value (i.e. offset value for the HeNB 300) is used to offset reception quality of the HeNB 300, and a determination is made whether or not the offset reception quality of the HeNB 300 exceeds reception quality of the eNB 200 (S32).

In connection with FIG. 13, description has been made to the case of correcting an offset value with a correction value set for each HeNB 300 after a common offset value is corrected. However, as long as the correction value set for each HeNB 300 is delivered in advance, the offset value may be corrected with the correction value set for each HeNB 300 without correcting the common offset value.

According to the wireless communication system according to the third embodiment, similar effects to the first embodiment can be achieved.

In this embodiment, the offset value is corrected in the UE 100 with the correction value set for each HeNB 300. The HeNB 300 generally has information on its own location in the macro cell (such as whether it is located near the eNB 200 or at a cell edge). The HeNB 300 can therefore set an appropriate correction value that takes into consideration its own location in the macro cell for each HeNB 300. Therefore, handover control can be performed with an appropriate correction value that takes into consideration interference in the uplink from the UE 100 to the base station. In addition, since the UE 100 does not need to select an offset correction value based on reception quality of the macro cell, a process load on the UE 100 can be reduced.

(Fourth Embodiment)

A communication system according to a fourth embodiment of the present invention will now be described below with reference to FIGS. 14 to 17. Here, description will primarily be made to differences of the embodiment from the first embodiment. The configuration and operation of the fourth embodiment are similar to those of the first embodiment unless otherwise noted.

This embodiment is configured to control the length of time during which the maximum transmission power of the HeNB 300 is increased based on reception quality of the HeNB 300 measured, by the UE 100, which is different from the first embodiment in which a timer is used to control the length of time during which the maximum transmission power of the HeNB 300 is increased.

Figure 14:
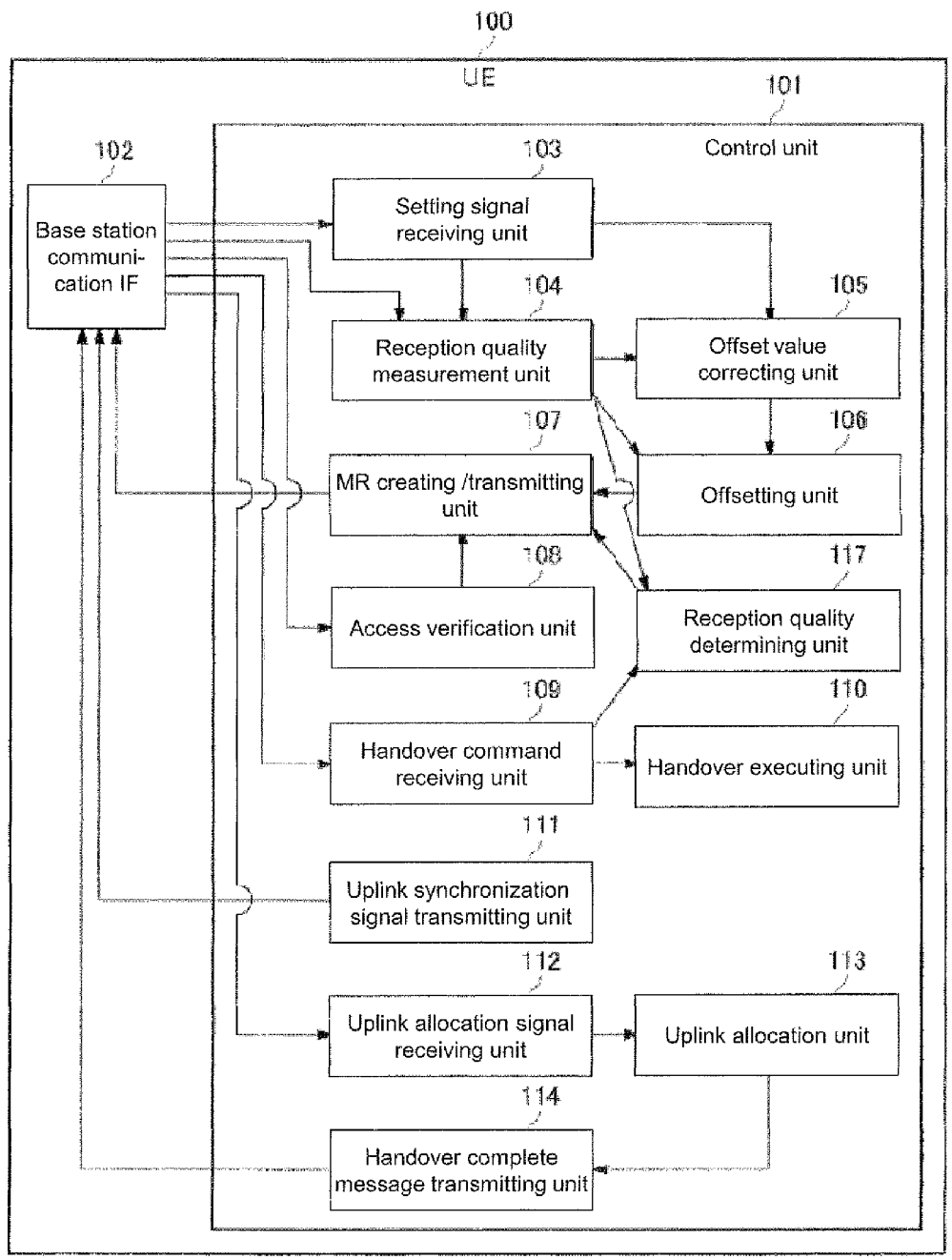
FIG. 14 is a block diagram of a user equipment according to a fourth embodiment.

FIG. 14 is a block diagram for illustrating a configuration of the UE 100 according to the embodiment. As shown in FIG. 14, in addition to the configuration of the first embodiment, the UE 100 according to the embodiment has a reception quality determining unit 117 for determining whether or not the reception quality of the HeNB 300 measured by the reception quality measurement unit of the UE 100 is higher than a threshold value Th transmitted from the HeNB 300. In this case, the handover command receiving unit 109 has a function of receiving a threshold value Th transmitted from the HeNB 300, which is a threshold value Th transmitted from the eNB 200 along with a handover command. Therefore, the handover command receiving unit 109 corresponds to a threshold value receiving unit of the invention. In addition, the MR creating/transmitting unit 107 is configured to create a measurement report that includes a result of a determination when it is determined that the reception quality of the HeNB 300 is higher than the threshold value Th, and transmit the report to the HeNB 300.

Figure 15:
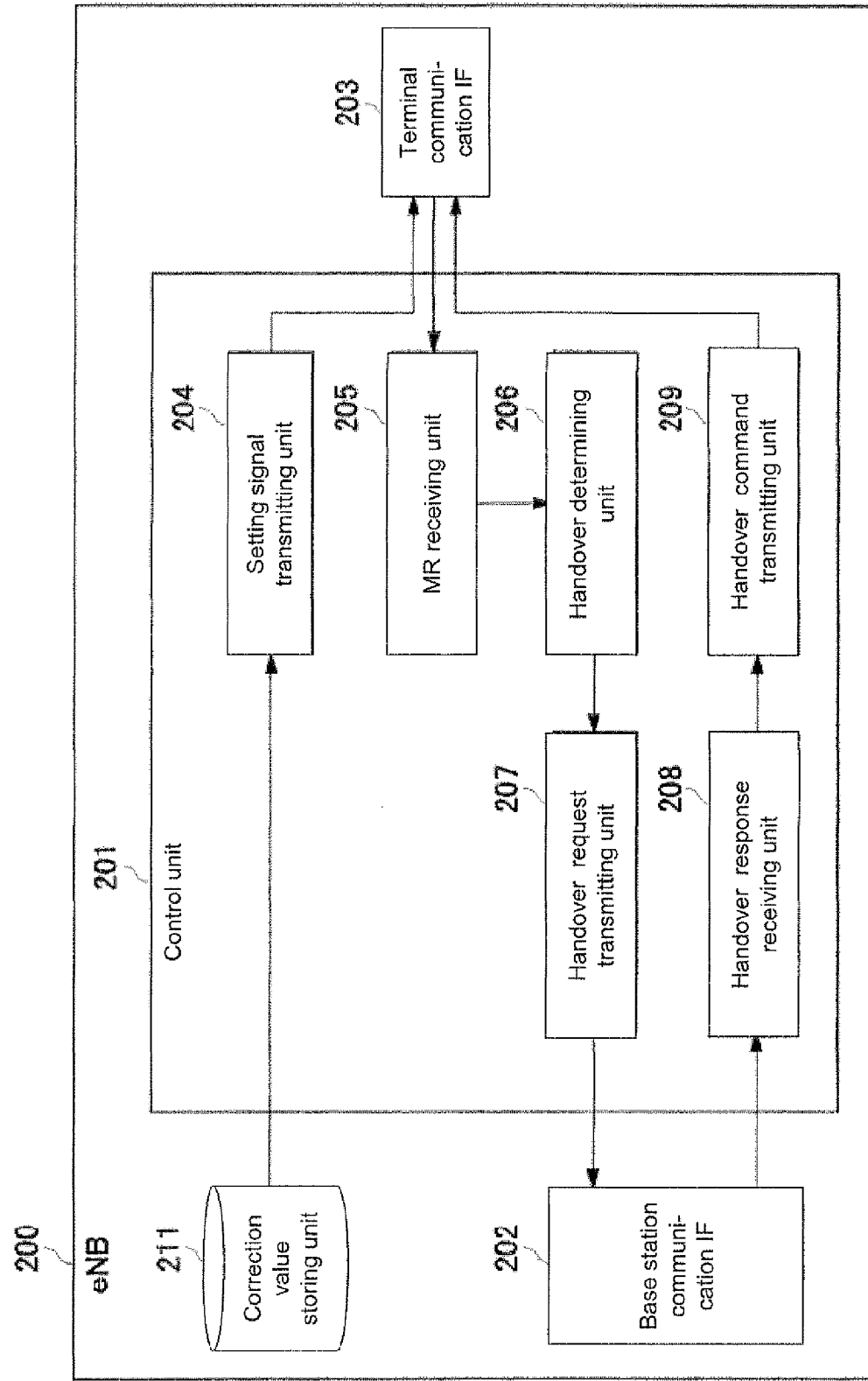
FIG. 15 is a block diagram of a macro cell base station according to the fourth embodiment.

FIG. 15 is a block diagram for illustrating a configuration of the eNB 200 according to the embodiment. As shown in FIG. 15, the handover response receiving unit 208 of the eNB 200 has a function of receiving the threshold value Th transmitted from the HeNB 300 along with a handover response, and the handover command transmitting unit 209 of the eNB 200 has a function of transmitting the threshold value Th to the UE 100 along with a handover command.

Figure 16:
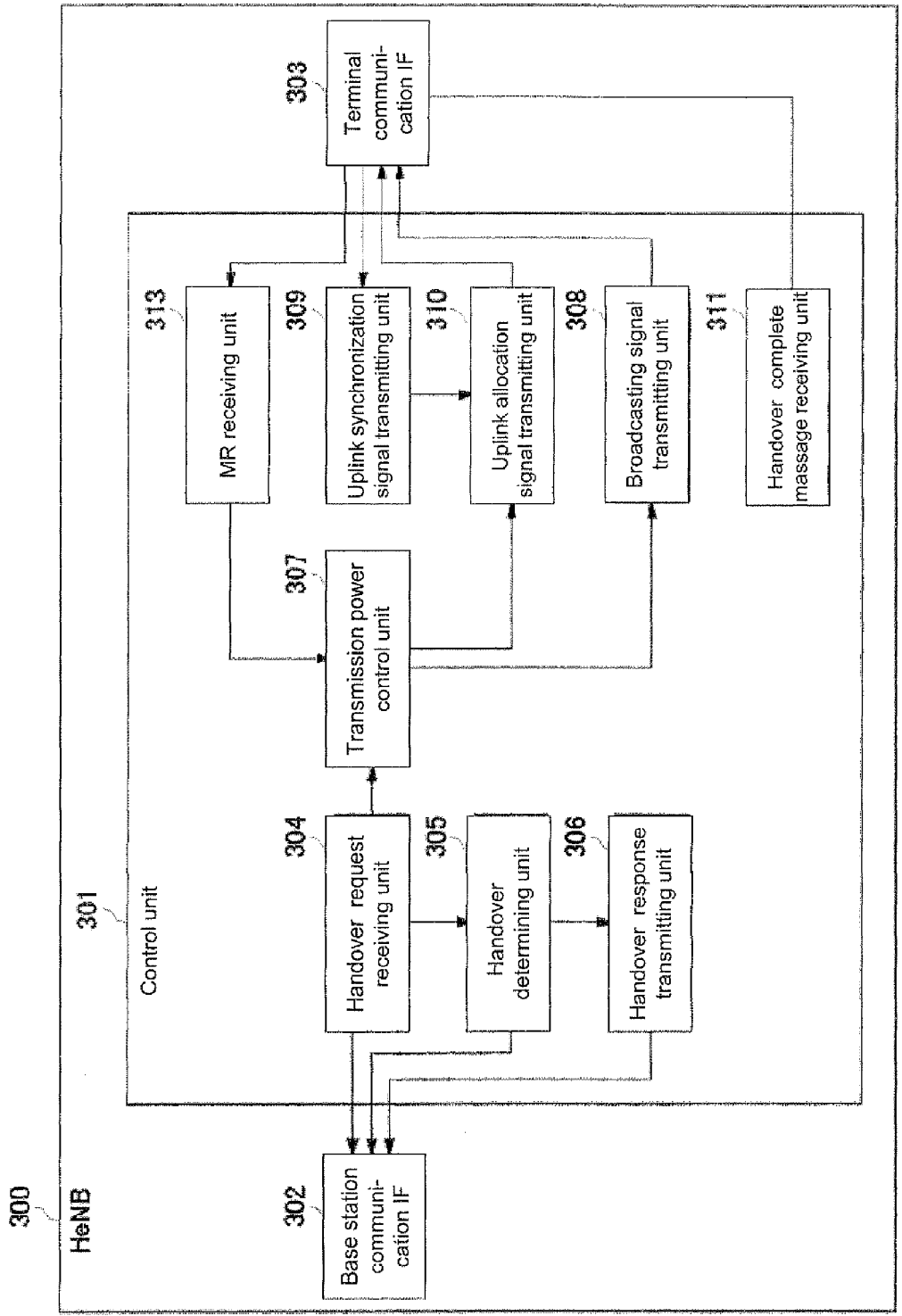
FIG. 16 is a block diagram of a CSG cell according to the fourth embodiment.

FIG. 16 is a block diagram for illustrating a configuration of the HeNB 300 according to the embodiment. As shown in FIG. 16, the handover response transmitting unit 306 of the HeNB 300 has a function of transmitting the threshold value Th to the eNB 200 along with a handover response. In addition to the configuration of the first embodiment, the HeNB 300 according to the embodiment has a measurement report receiving unit 313 (MR receiving unit) for receiving a measurement report transmitted from the UE 100. The transmission power controlling unit 307 is configured to control the maximum transmission power of the HeNB 300 to be restored, once it is confirmed, based on the measurement report, that the UE 100 determines that the reception quality of the HeNB 300 is higher than the threshold value Th.

The operation of a thus configured communication system will be described with reference to drawings. Similarly, description will primarily be made to differences in the operation of the communication system from that of the first embodiment.

Figure 17:
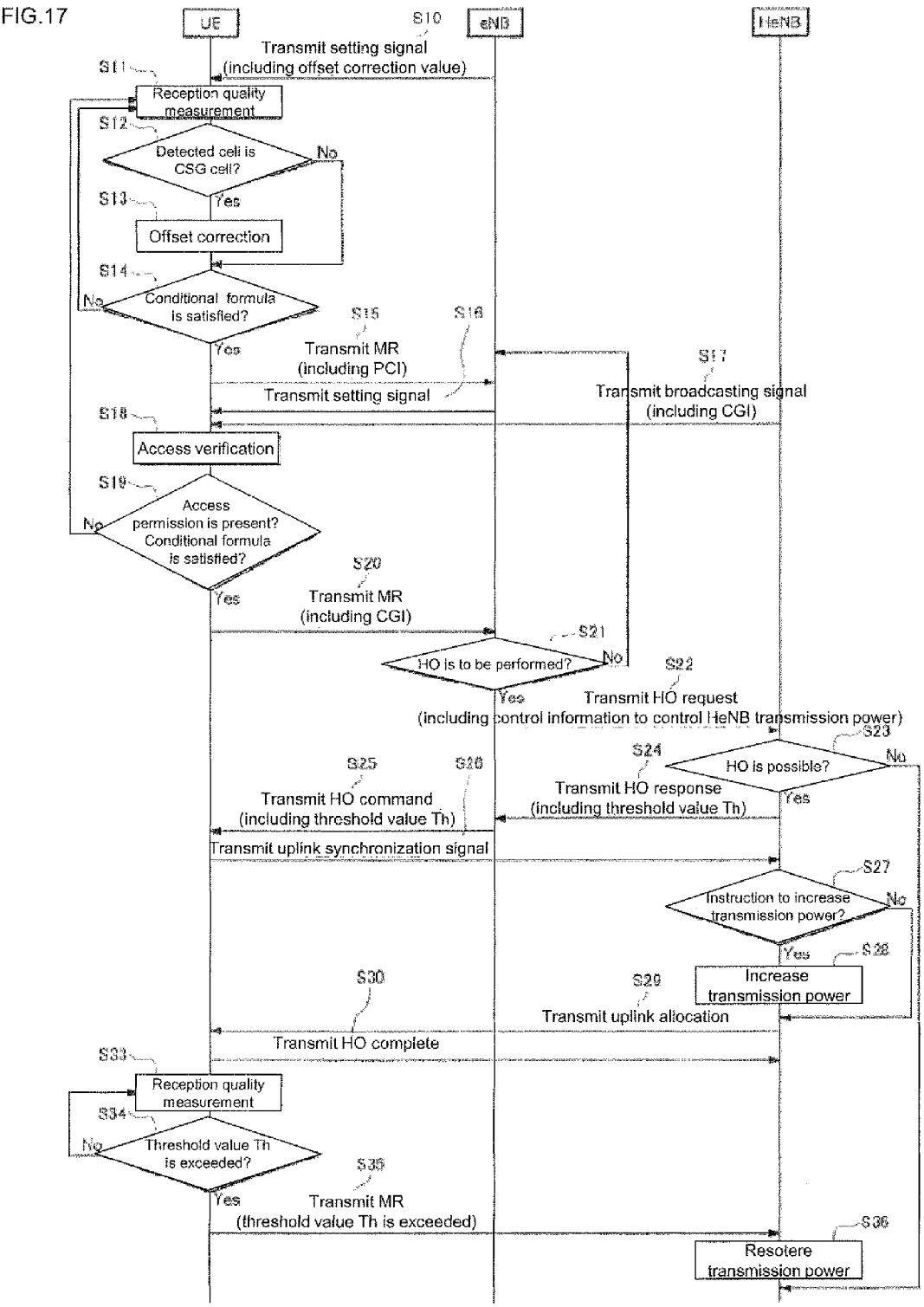
FIG. 17 is a sequence diagram for illustrating an operation of the communication system according to the fourth embodiment.

FIG. 17 is a sequence diagram for illustrating an operation of the communication system according to the embodiment. In this case, as shown in FIG. 17, when the HeNB 300 determines that a handover of the UE 100 may be allowed (S23), the HeNB 300 transmits a threshold value Th along with a handover response signal to the eNB 200 (S24). Upon receiving the handover response and the threshold value Th, the eNB 200 transmits the threshold value Th along with a handover command signal to the UE 100 (S25).

As shown in FIG. 17, after the handover to the HeNB 300 completes, the UE 100 measures reception quality of the HeNB 300 with which the UE 100 is in connection (S33) and determines whether or not the reception quality of the HeNB 300 exceeds the threshold value Th (S34). Information necessary for the reception quality measurement is included in the handover command and the handover response. When it is determined that the reception quality of the HeNB 300 exceeds the threshold value Th, the UE 100 transmits a measurement report that contains the result to the HeNB 300 (S35). Upon receiving the measurement report, the HeNB 300 restores the maximum transmission power (S36).

According to the wireless communication system according to the fourth embodiment, similar effects to the first embodiment can be achieved.

In this embodiment, when the reception quality from the macro cell is lower (below the threshold value T1), the UE 100 is controlled to perform a handover even if the reception quality from the CSG cell is low to some extent, such as when the UE 100 is located relatively far away from the HeNB 300. In this case, since the transmission power of the HeNB 300 is controlled to increase, the UE 100 can have the benefit of sufficient reception quality from the HeNB 300 after the UE 100 is handed over to the HeNB 300.

In this case, when a predetermined threshold value Th (a third threshold value) is transmitted from the HeNB 300 to the UE 100 and the reception quality of the CSG cell increases (above the third threshold value Th), the transmission power of the HeNB 300 is controlled to be restored. For example, when the UE 100 approaches to the HeNB 300 after the handover so that the reception quality of the CSG cell increases to some extent, the transmission power of the HeNB 300 may be reduced. In this way, it is possible to avoid unnecessarily large transmission power of the HeNB 300.

(Fifth Embodiment)

A communication system according to a fifth embodiment of the present invention will now be described below with reference to FIG. 18. Here, description will primarily be made to differences of the embodiment from the first embodiment. The configuration and operation of the fifth embodiment are similar to those of the first embodiment unless otherwise noted.

This embodiment is configured to correct an offset value while interference with other cells from a downlink (DL) signal transmitted to the UE 100 is taken into consideration, which is different from the first embodiment in which an offset value is corrected with interference from an uplink (UL) signal taken into consideration.

The offset value correcting unit 105 of the UE 100 according the embodiment is configured to correct a correction value α or β while DL interference with other CSG cells of the same frequency is taken into consideration. For example, if the difference in reception quality between a CSG cell that has the best reception quality (i.e. best CSG cell) and a CSG cell that has the second best reception quality is smaller than a threshold value Tc, it is conceivable that the distance between the CSG cells is small and increasing the offset value may cause much DL interference with other cells. Therefore, the embodiment is configured to decrease the offset correction value α in such a case.

The operation of a thus configured communication system will be described with reference to drawings. Similarly, description will primarily be made to differences in the operation of the communication system from that of the first embodiment.

Figure 18:
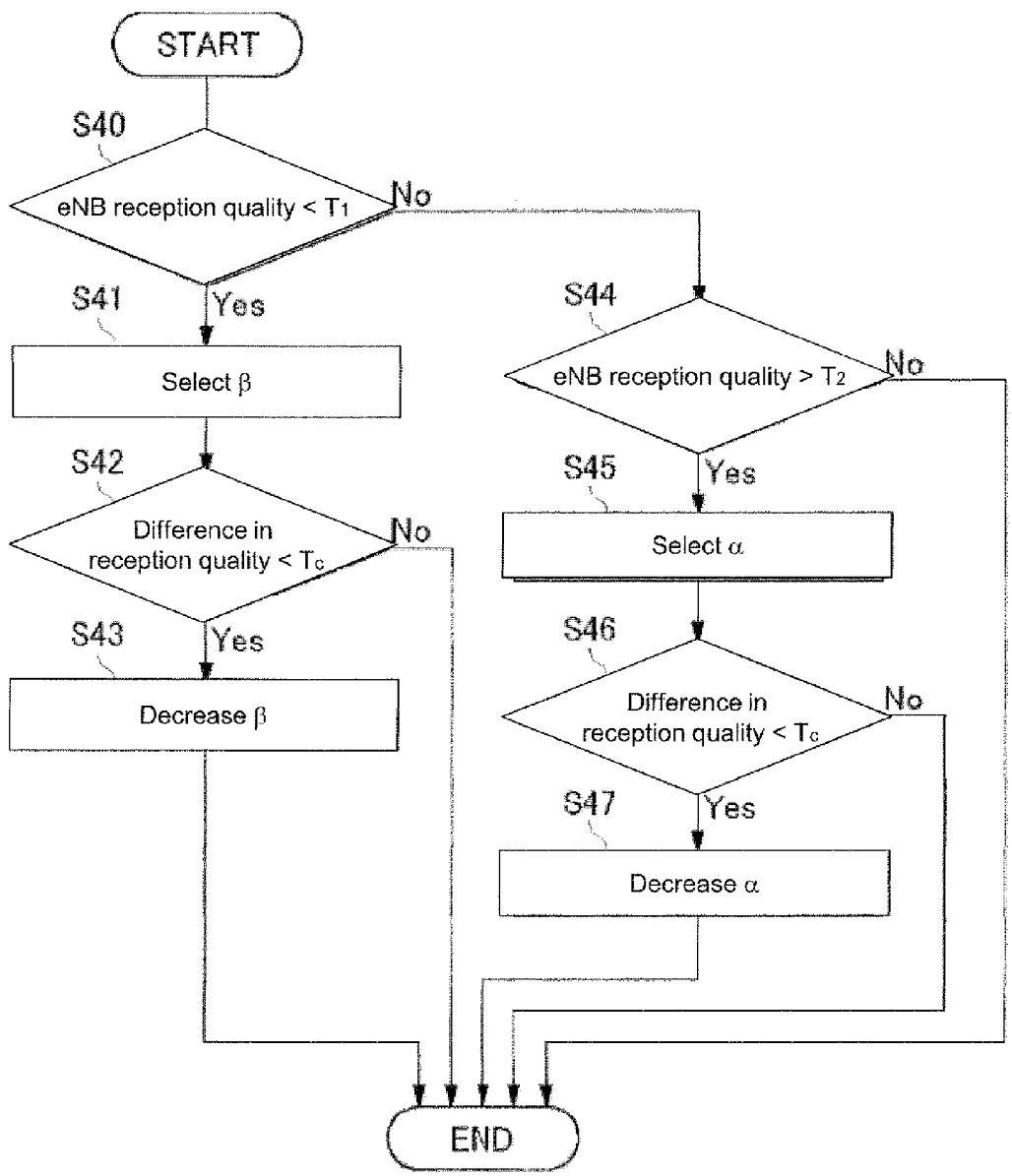
FIG. 18 is a flow chart showing a flow of correcting a correction value in a fifth embodiment.

FIG. 18 is a flow chart showing a flow of correcting a correction value in the embodiment. As shown in FIG. 18, in the UE 100, a determination is first made whether or not reception quality from the eNB 200 is lower than a threshold value T1 (S40). When the reception quality from the eNB 200 is lower than the threshold value T1, a correction value β is selected for correction (S41). A determination is then made whether or not the difference in reception quality between a CSG cell that has the best reception quality and a CSG cell that has the second best reception quality is smaller than a threshold value Tc (S42). When it is determined that the difference in reception quality is smaller the threshold value Tc, the correction value β is corrected to a smaller value (S43).

On the other hand, when the reception quality from the eNB 200 is not lower than the threshold value T1, then a determination is made whether or not the reception quality from the eNB 200 is higher than the threshold value T2 (S44). When the reception quality from the eNB 200 is higher than the threshold value T2, a correction value α is selected for correction (S45). A determination is then made whether or not the difference in reception quality between a CSG cell that has the best reception quality and a CSG cell that has the second best reception quality is smaller than a threshold value Tc (S46). When it is determined that the difference in reception quality is smaller the threshold value Tc, the correction value α is corrected to a smaller value (S47).

According to the wireless communication system according to the fifth embodiment similar effects to the first embodiment can be achieved.

In this embodiment, a correction value α or β is corrected based on reception quality from two or more HeNBs 300 around the UE 100. For example, when there are two HeNBs 300 around the UE 100 and the two HeNBs 300 are close to each other, interference may occur in the downlinks from the two HeNBs 300 to the UE 100. In such a case, the correction value α or β is corrected based on the reception quality from the two HeNBs 300.

For example, when the difference in reception quality between the two HeNBs 300 is smaller, the correction value α or β is corrected to a lower value so that a handover is performed less easily when reception quality of HeNBs 300 is low, such as when the UE 100 is located away from the HeNBs 300. In this way, when two HeNBs 300 are close to each other, the UE 100 is controlled to be handed over more easily when the UE 100 is located near one of the HeNBs 300. The transmission power of the HeNBs 300 can then be reduced and interference in the downlink from an HeNB 300 to the UE 100 (caused by a large transmission power of the HeNB 300) can be suppressed. Therefore, an appropriate offset value that takes into consideration interference in the downlink from the HeNB 300 to the UE 100 can be used.

Specifically, when the difference between the highest reception quality of an HeNB 300 and the second highest reception quality of an HeNB 300 is smaller, such as when it is smaller than a threshold value Tc, a correction value α or β used to correct an offset value is corrected to a lower value. In this way, an appropriate offset value that takes into consideration interference in the downlink from the HeNB 300 to the UE 100 can be used.

(Sixth Embodiment)

A communication system according to a sixth embodiment of the present invention will now be described below with reference to FIGS. 19 to 22. Here, description will primarily be made to differences of the embodiment from the first embodiment. The configuration and operation of the sixth embodiment are similar to those of the first embodiment unless otherwise noted.

In this embodiment, a handover from a macro cell to a CSG cell is controlled based on a result of comparison between reception quality of the CSG cell and a predetermined threshold value, which is different from the first embodiment in which a handover from the macro cell to the CSG cell is controlled based on a result of comparison between reception quality of the macro cell and that of the CSG cell.

Figure 19:
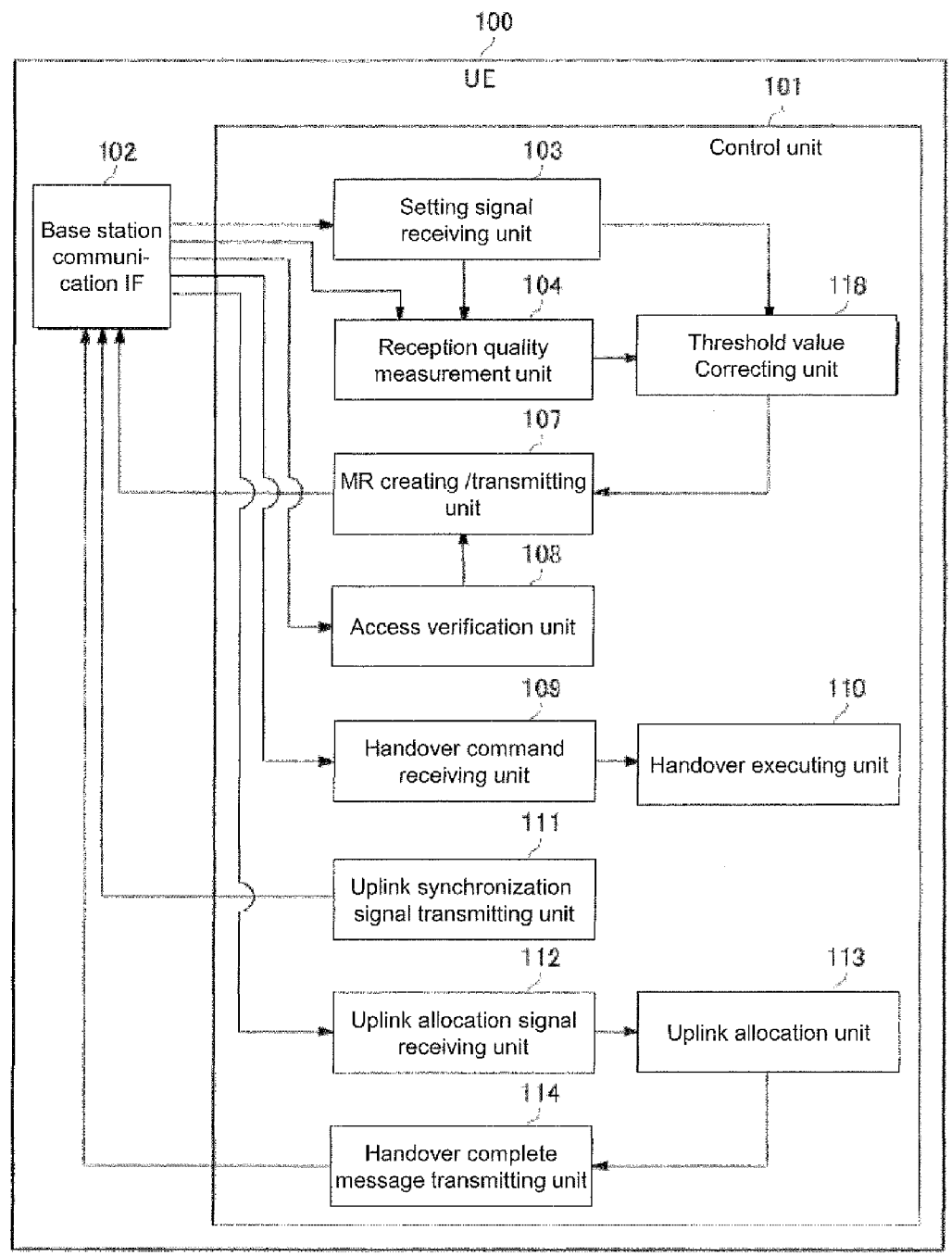
FIG. 19 is a block diagram of a user equipment according to a sixth embodiment.

FIG. 19 is a block diagram for illustrating a configuration of the UE 100 according to the embodiment. As shown in FIG. 19, the control unit 101 of the UE 100 is provided with a threshold value correcting unit 118 for correcting a threshold value depending on the reception quality of the macro cell, and the MR creating/transmitting unit 107 has a function of notifying reception quality of a CSG cell along with a PCI of the HeNB 300, if the reception quality of the CSG cell exceeds a corrected threshold value, to the eNB 200 as a reception quality measurement result. The MR creating/transmitting unit 107 may also notify reception quality of a CSG cell along with a PCI of the HeNB 300, if the reception quality of the CSG cell exceeds a corrected threshold value and is lower than a second threshold value for the reception quality of the macro cell (serving cell), to the eNB 200 as a reception quality measurement result. In this case, the threshold value correcting unit 118 may correct the second threshold value depending on the reception quality of the macro cell.

Correction of a threshold value will now be described with reference to a specific example. For example, the UE 100 has a preset standard value for the threshold value, and receives from a base station (such as the eNB 200 and the HeNB 300) two correction values used to correct the standard, threshold value: a correction value "a" for use in the case of the proximity to the eNB 200 and a correction value "b" for use in the case of cell edge. For example, the correction value "a" is smaller than zero (a<0) and correction value "b" is larger than zero (b>0). The threshold value correcting unit 118 corrects the threshold value with the correction value "a" or "b" depending on the reception quality of the macro cell.

Figure 20:
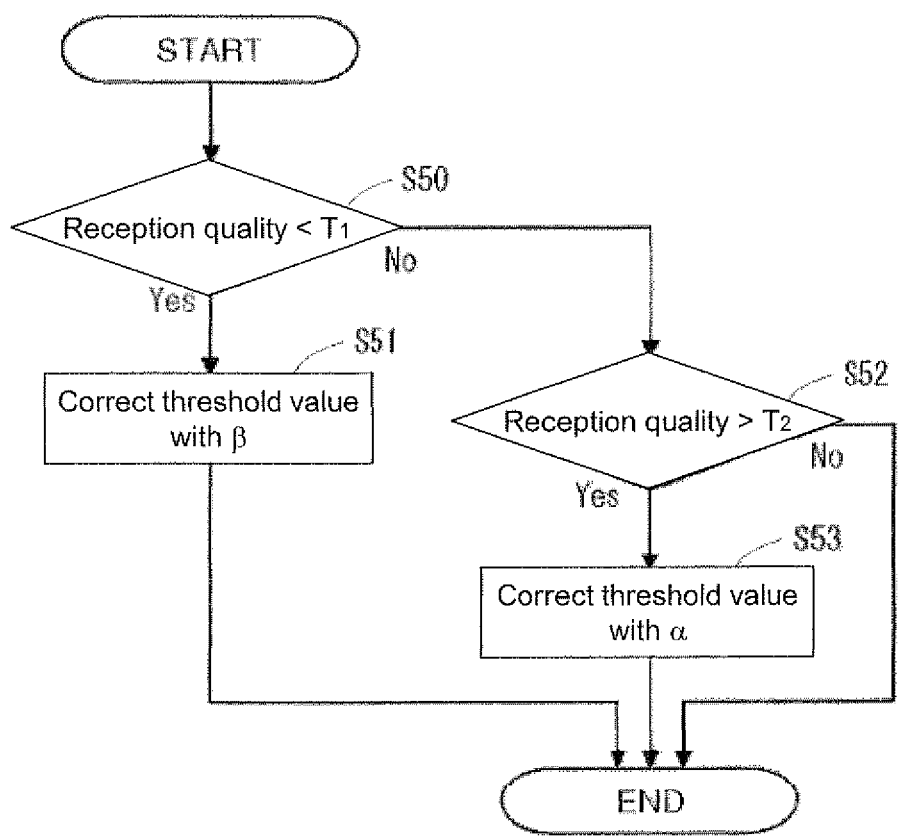
FIG. 20 is a flow chart of correcting a threshold value in the sixth embodiment.

FIG. 20 is a flow chart of an operation of the threshold value correcting unit 118 (correction of a threshold value). As shown in FIG. 20, the threshold value correcting unit 118 determines whether or not reception quality of the eNB 200 is lower than T1, which is a threshold value for the reception quality (S50). If the reception quality of the eNB 200 is lower than T1, the threshold value is corrected with the correction value "b" (S51). On the other hand, if the reception quality of the eNB 200 is not lower than T1, then a determination is made whether or not the reception quality of the eNB 200 exceeds T2, which is a threshold value for the reception quality (S52). If the reception quality of the eNB 200 exceeds T2, the threshold value is corrected with the correction value "a" (S53). Although description has been made to the case of a correction value "a"<0 and a correction value "b">0, the scope of the invention is not limited thereto and any correction value satisfying a condition of "a"<"b" may be used. In addition, the values T1 and T2 may be the same (T1=T2). Similarly, such threshold correction may be applied to the second threshold value.

According to the communication system according to the sixth embodiment of the invention, similar effects to the first embodiment can be achieved.

In this embodiment, handover control can be performed with an appropriate threshold value that takes into consideration interference in the uplink from the UE 100 to the base station. In other words, in the UE 100, a threshold value is corrected depending on reception quality from a macro cell, and then the threshold value is used for handover control. In this case, reception quality of a CSG cell is compared with a threshold value for the reception quality, and a handover to the CSG cell is controlled based on the comparison result. Specifically, when the CSG cell reception quality is higher than the threshold value, the UE 100 is controlled to perform a handover.

For example, when the macro cell reception quality is higher, such as when the UE 100 is located near the eNB 200, the threshold value is corrected to a higher value. The UE 100 is thus controlled to withhold from performing a handover when the CSG cell reception quality is low to some extent, such as when the UE 100 is located away from the HeNB 300. In this way, a handover is performed only when the UE 100 is located relatively closer to the base station. In this way, the transmission power used when the UE 100 transmits a signal to the base station can be suppressed to relatively low. Therefore, when the UE 100 is located near the base station, interference in the uplink from the UE 100 to the base station caused by a large transmission power of the UE 100 can be suppressed. Therefore, handover control can be performed with an appropriate threshold value that takes into consideration interference in the uplink from the UE 100 to the base station.

Meanwhile, when the reception quality of the macro cell is lower, such as when the UE 100 is located at a cell edge, for example, the threshold value is corrected to a smaller value. The UE 100 is thus controlled to perform a handover even when the CSG cell reception quality is low to some extent, such as when the UE 100 is located relatively far away from the HeNB 300. In this case, since the UE 100 is located away from the base station (such as the eNB 200 and the HeNB 300), less interference may occur in the uplink from the UE 100 to the base station even if the transmission power of the UE 100 is large to some extent. In such a case, since the UE 100 is controlled to perform a handover even when the UE 100 is located away from the base station, probabilities of the UE 100 missing an opportunity to perform a handover can be decreased. Therefore, handover control can be performed with an appropriate threshold value that takes into consideration interference in the uplink from the UE 100 to the base station.

In the example, description has been made to the case of the UE 100 that has a preset standard value for the threshold value and receives, from a base station (such as the eNB 200 and the HeNB 300), two correction values used to correct the standard threshold value. The scope of the invention, however, is not limited thereto and the UE 100 may receive two threshold values from a base station: a threshold value Ta for use in the case of the proximity to the eNB 200 and a threshold value Tb for use in the case of cell edge, where Ta>Tb.

Figure 21:
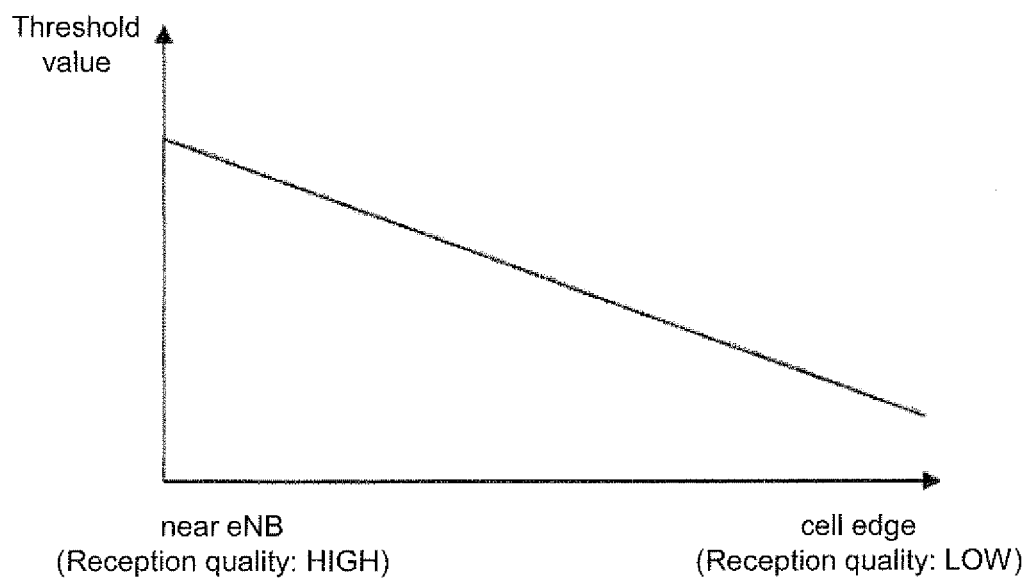
FIG. 21 is a diagram showing an example of a correlation between reception quality of a macro cell and a threshold value.

The threshold value correcting unit 118 may have a function of calculating a threshold value depending on reception quality of a macro cell. For example, the UE 100 may receive, from a base station (such as the eNB 200 and the HeNB 300), data used to calculate a threshold value, such as mathematical formulas indicative of a correlation between reception quality of a macro cell and a threshold value as shown in FIG. 21 and a table that associates reception quality of a macro cell with a threshold value. In this case, the threshold value correcting unit 118 may calculate an appropriate threshold value depending on the reception quality of the macro cell. Therefore, a threshold value can be set more flexibly at the UE 100.

Figure 22:
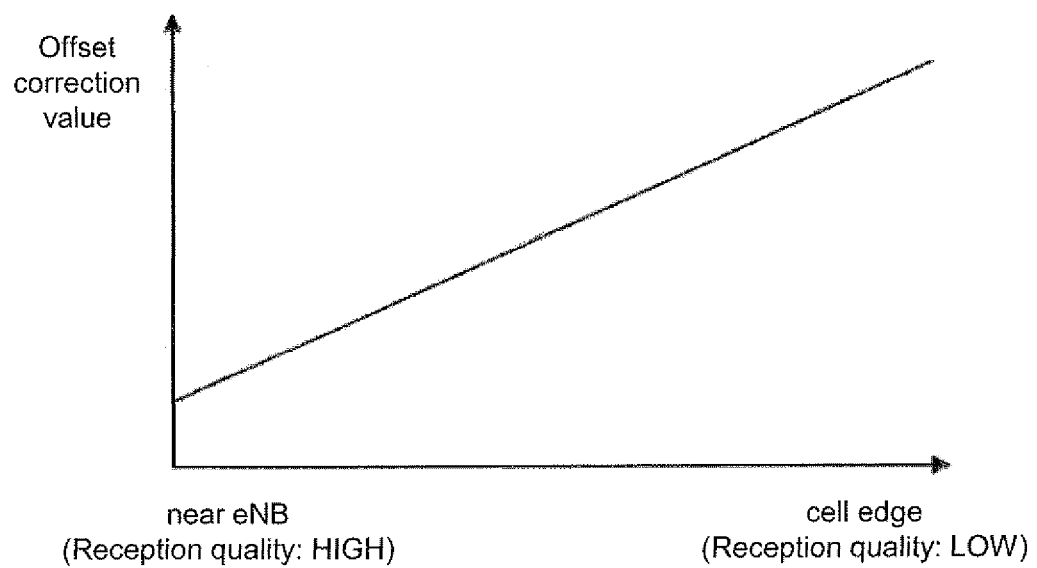
FIG. 22 is a diagram showing an example of a correlation between reception quality of a macro cell and an offset value.

Similarly to the threshold value correcting unit 118 according to the embodiment, the offset value correcting unit 105 according to the first to third embodiments may have a function of calculating an offset value depending on reception quality of a macro cell. For example, the UE 100 may receive, from a base station (such as the eNB 200 and the HeNB 300), data used to calculate an offset value, such as mathematical formulas indicative of a correlation between reception quality of a macro cell and an offset value as shown in FIG. 22 and a table that associates reception quality of a macro cell with an offset value. In this case, the offset value correcting unit 105 may calculate an appropriate offset value depending on the reception quality of the macro cell. Therefore, an offset value can be set more flexibly at the UE 100.

(Seventh Embodiment)

A communication system according to a seventh embodiment of the present invention will now be described below with reference to FIGS. 23 to 24. Here, description will primarily be made to differences of the embodiment from the first embodiment. The configuration and operation of the seventh embodiment are similar to those of the first embodiment unless otherwise noted.

This embodiment has a function of accommodating a hybrid CSG cell, which is accessible as a CSG cell to a member that has access permission and accessible as a macro cell to a member that does not have access permission. This is different from the first embodiment in which only a regular CSG cell, which is accessible to a member UE 100 that has access permission, is assumed.

Figure 23:
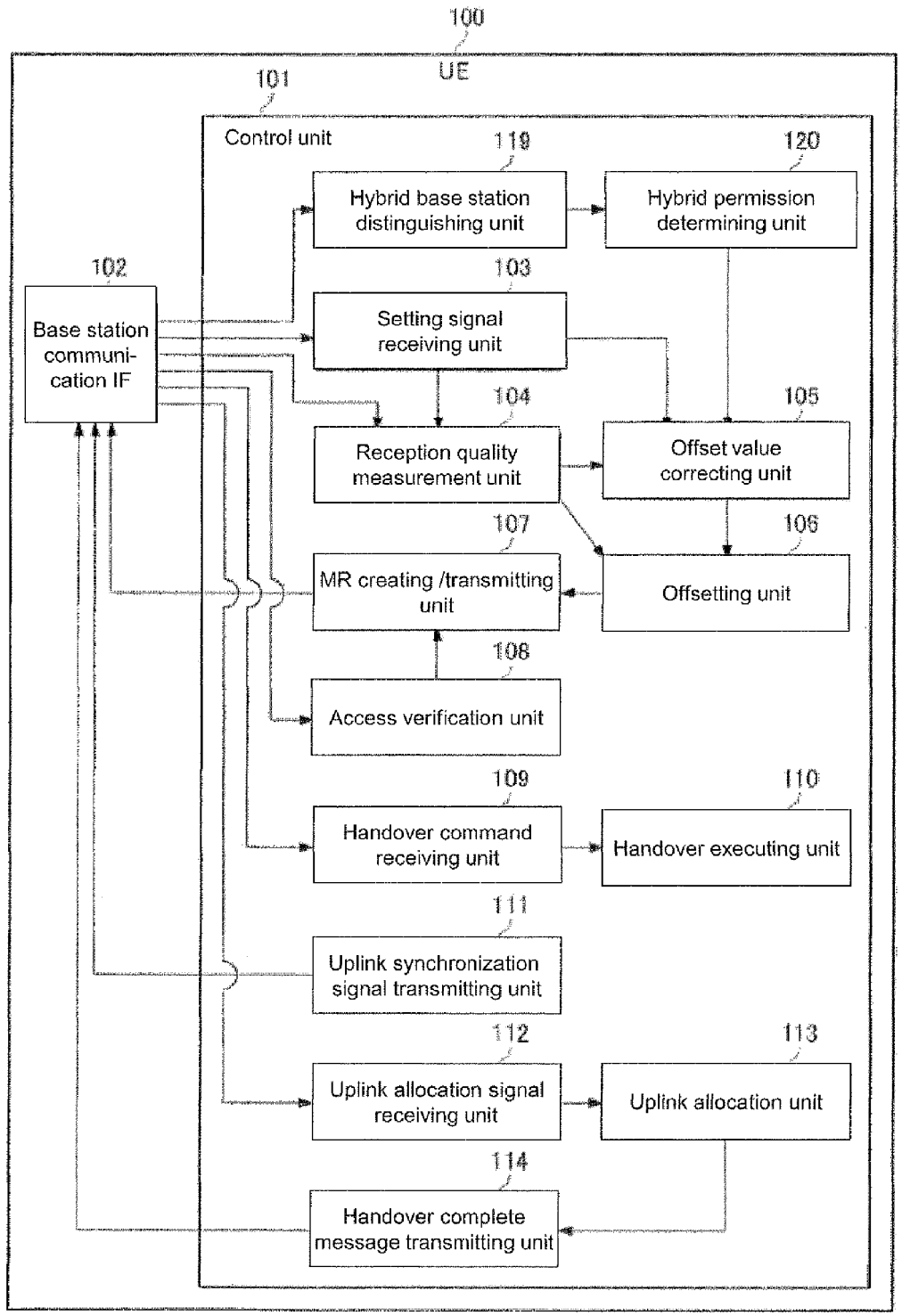
FIG. 23 is a block diagram of a user equipment according to a seventh embodiment.

FIG. 23 is a block diagram for illustrating a configuration of the UE 100 according to the embodiment. As shown in FIG. 23, the control unit 101 of the UE 100 comprises a hybrid base station distinguishing unit 119 for distinguishing whether or not a base station detected by the UE 100 as a handover destination in a cell is a base station of a hybrid CSG cell, and a hybrid permission determining unit 120 for determining whether or not the UE 100 is a member of the hybrid CSG cell (i.e. whether or not the UE 100 has access permission).

For example, the hybrid base station distinguishing unit 119 may distinguish whether or not the base station of the detected cell is that of a hybrid CSG cell based on cell ID (PCI) information of the cell. Further, the hybrid base station distinguishing unit 119 may distinguish whether or not the base station of the detected cell is that of a hybrid CSG cell based on system information transmitted from the cell.

For example, the hybrid permission determining unit 120 determines whether or not the UE 100 has a list of cell ID (PCI) information of hybrid CSG cells that include the UE 100 as a member and whether or not the UE 100 is a member of the hybrid CSG cell based on the list. When it is determined that the UE 100 has access permission by the hybrid permission determining unit 120, an offset value is corrected. On the other hand, when it is determined that the UE 100 does not have access permission, an offset value is not corrected.

Figure 24:
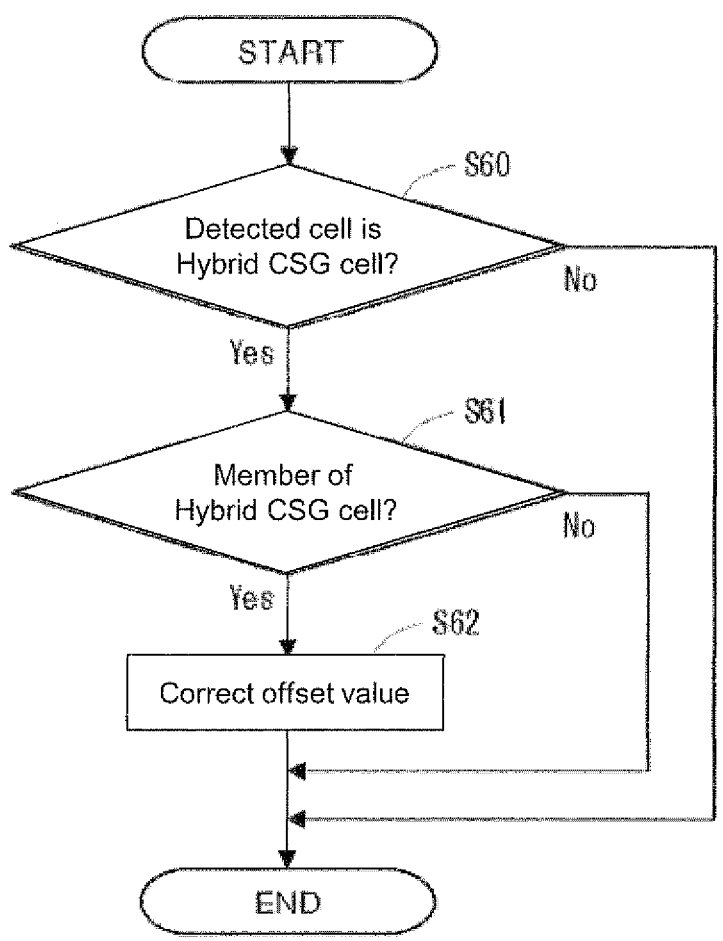
FIG. 24 is a flow chart showing a flow of processing in a user equipment according to the seventh embodiment.

FIG. 24 is a flow chart showing a flow of processing in the UE 100 according to the embodiment. As shown in FIG. 24, upon detecting a cell of handover destination, the UE 100 first distinguishes whether or not the detected cell is a hybrid CSG cell (S60). When the cell is distinguished as a hybrid CSG cell, then a determination is made whether or not the UE 100 is a member of the hybrid CSG cell (i.e. whether the UE 100 has access permission)(S61). When it is determined that the UE 100 has access permission, an offset value is corrected (S62), and when it is determined that the UE 100 does not have access permission, the offset value is not corrected.

According to the communication system according to the seventh embodiment of the invention, similar effects to the first embodiment can be achieved.

In this embodiment, it is possible to appropriately accommodate a hybrid CSG cell, which is accessible as a CSG cell to the UE 100 that has access permission and accessible as a macro cell to the UE 100 that does not have access permission. Therefore, even for a hybrid CSG cell, handover control can be performed with an appropriate offset value that takes into consideration interference in the uplink from the UE 100 to the base station.

In the example, although description has been made to the case of correcting an offset value to accommodate a hybrid CSG cell, the scope of the invention is not limited thereto and a threshold value may be corrected to accommodate a hybrid CSG cell in a similar way as described above. In other words, when a cell detected as a handover destination is distinguished as a hybrid CSG cell, a determination is made whether or not the UE 100 is a member of the hybrid CSG cell (i.e. whether the UE 100 has access permission). As a result, when it is determined that the UE 100 has access permission, a threshold value may be corrected, and when it is determined that the UE 100 does not have access permission, the threshold value may not be corrected. In this way, even for a hybrid CSG cell, handover control can be performed with an appropriate threshold value that takes into consideration interference in the uplink from the UE 100 to the base station.

(Eighth Embodiment)

A communication system according to an eighth embodiment of the present invention will now be described below with reference to FIGS. 25 to 28. Here, description will primarily be made to differences of the embodiment from the first embodiment. The configuration and operation of the eighth embodiment are similar to those of the first embodiment unless otherwise noted.

In this embodiment, inter-frequency measurement for a CSG cell that has a service bandwidth different from that of a macro cell inside a service bandwidth of the macro cell is assumed, which is different from the first embodiment in which inter-frequency measurement for a CSG cell that has a service bandwidth different from that of a macro cell outside a service bandwidth of the macro cell is assumed.

Figure 25:
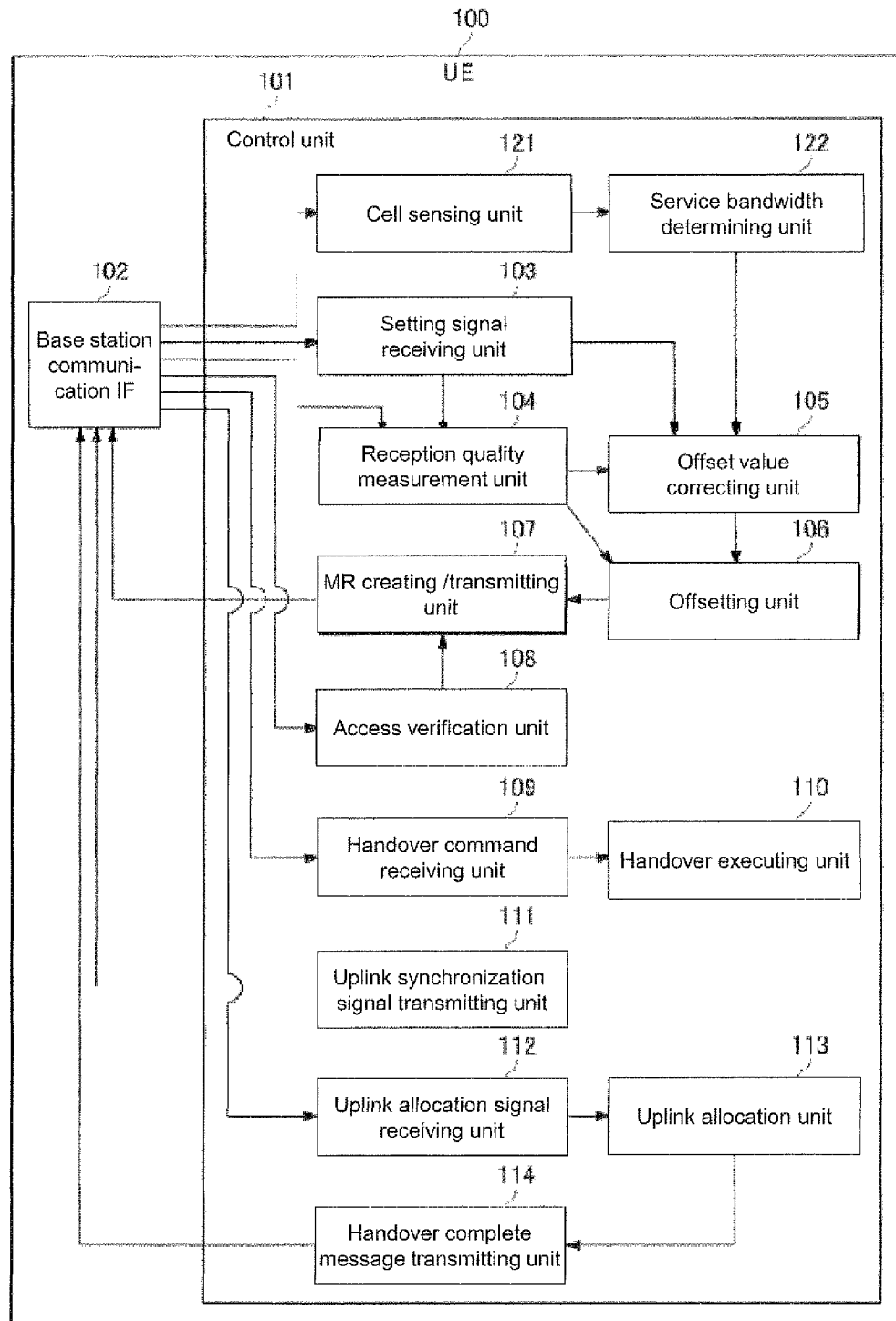
FIG. 25 is a block diagram of a user equipment according to an eighth embodiment.

FIG. 25 is a block diagram for illustrating a configuration of the UE 100 according to the embodiment. As shown in FIG. 25, the control unit 101 of the UE 100 comprises, as an arrangement for inter-frequency measurement, a cell sensing unit 121 for sensing a CSG cell that has a service bandwidth different from that of a macro cell, and a service bandwidth determining unit 122 for determining whether or not the cell detected by the cell sensing unit 121 is inside the service bandwidth of the macro cell.

Incidentally, the inter-frequency measurement function may be initiated based on fingerprint information retained in the UE 100 or the network. For example, if a history is left as fingerprint information vindicating that the UE 100 accessed the base station when it previously passed the area in a different frequency from the frequency currently used by the UE 100 to access the base station, the UE 100 may be controlled to trigger the inter-frequency measurement.

Figure 26:
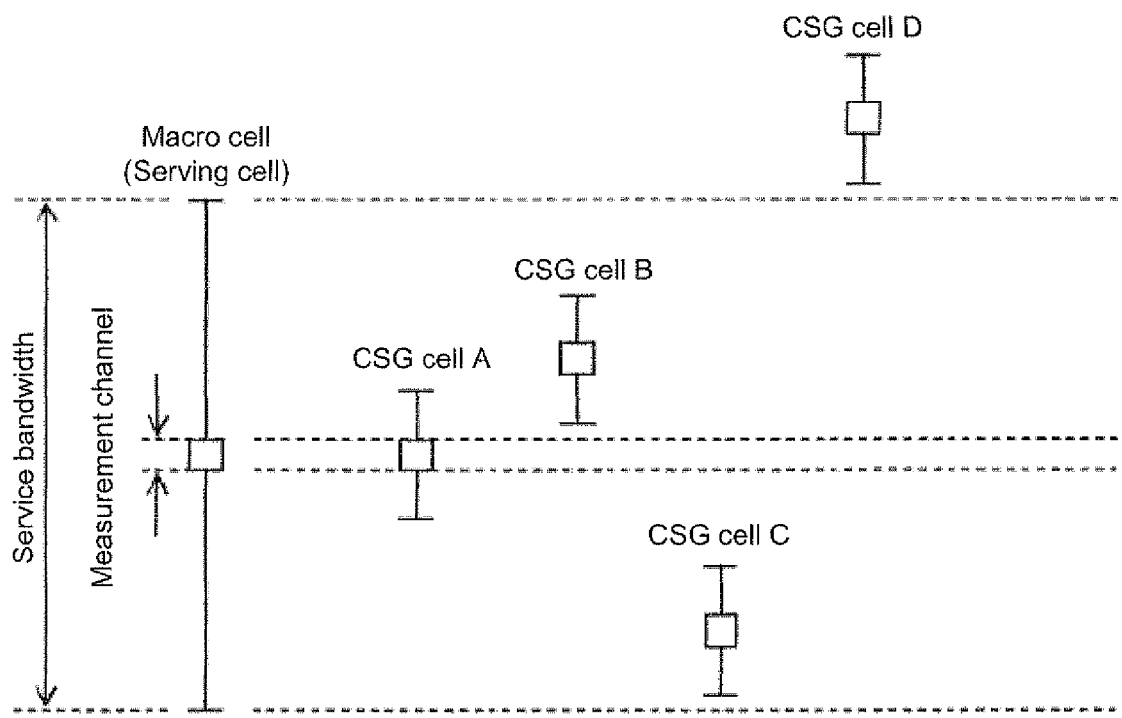
FIG. 26 is a diagram for illustrating inter-frequency measurement according to the eighth embodiment.

The inter-frequency measurement according to the embodiment will be specifically described with reference to FIG. 26. In FIG. 26, a square represents a control channel such as synchronization channel (SCH) and a broadcasting channel (BCH) for use in measurement of the cell and bars extending upward and downward from the square indicates the service bandwidth (frequency band) of the cell.

In this example, both CSG cells B and C have a service bandwidth of a frequency different from that of a macro cell inside a service bandwidth of the macro cell; therefore, the CSG cells B and C are detected in the inter-frequency measurement according to the embodiment. Since a CSG cell A has a control channel for use in measurement of the same frequency as the service bandwidth of the macro cell, the CSG cell A is detected in the intra-frequency measurement. Since a CSG cell D has a service bandwidth of a frequency different from that of a macro cell outside a service bandwidth of the macro cell, the CSG cell D is detected in the inter-frequency measurement according to the first embodiment.

Figure 27:
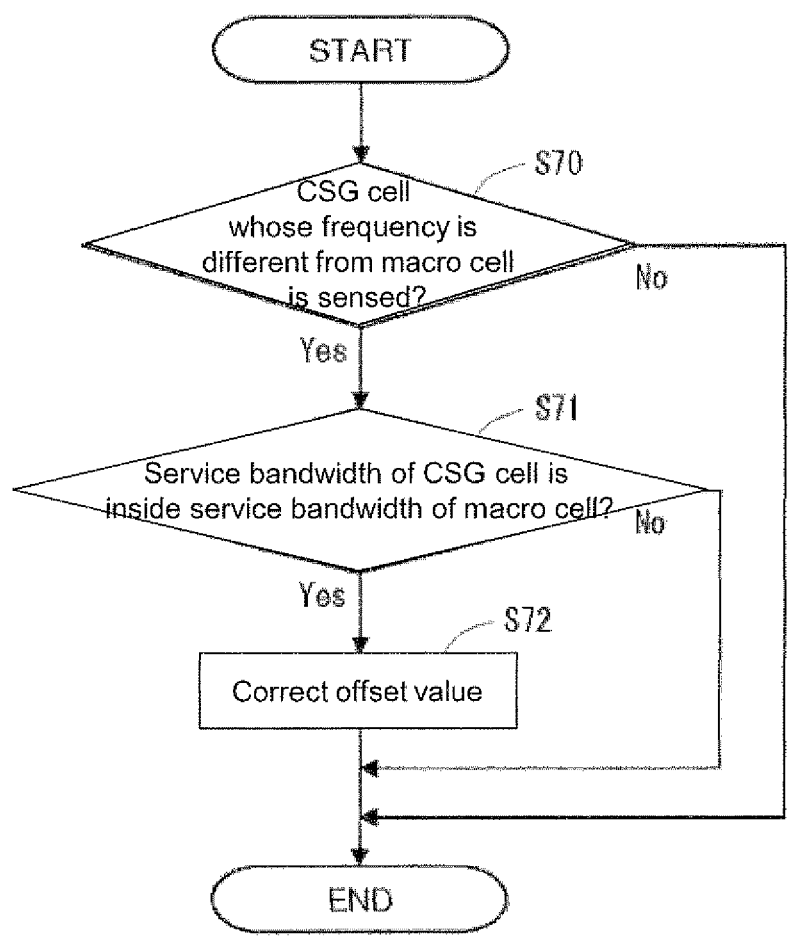
FIG. 27 is a flow chart showing a flow of processing in a user equipment according to the eighth embodiment.

FIG. 27 is a flow chart showing a flow of processing in the UE 100 according to the embodiment. As shown in FIG. 27, when the UE 100 performs the inter-frequency measurement, a determination is made whether or not a CSG cell that has a service bandwidth different from that of a macro cell is sensed (S70), and when it is determined that one is detected, a determination is made whether or not the detected cell is inside the service bandwidth of the macro cell (S71). When it is determined that the cell is inside the service bandwidth of the macro cell, an offset value is corrected (S72), and when it is determined that the cell is outside the service bandwidth, the offset value is not corrected.

According to the communication system according to the eighth embodiment of the invention, similar effects to the first embodiment can be achieved.

In this embodiment, when a CSG cell that has a service bandwidth of a frequency different from that of a macro cell is detected in the inter-frequency measurement and then the service bandwidth of the CSG cell is inside the service bandwidth of the macro cell, handover control is performed with an appropriate offset value that takes into consideration interference in the uplink from the UE 100 to the base station. Therefore, interference in the uplink from the UE 100 to the base station can be suppressed.

As shown in FIG. 28, there may be a case where a service bandwidth of another macro cell (macro cell B) exists near a service bandwidth of a serving cell (macro cell A). In this case, CSG cells D, E and F that have a service bandwidth of a frequency different from that of the macro cell (macro cell B) inside a service bandwidth of the macro cell (macro cell B) may be detected in the inter-frequency measurement according to the embodiment. When it is determined that the CSG cell D, E or F is inside the service bandwidth of the macro cell as a result of the inter-frequency measurement to correct an offset value, the offset value is corrected based on the reception quality of the macro cell B, which is a macro cell that may cause interference in the uplink with the CSG cells D, E and F.

In the example, although description has been made to the case of correcting an offset value when it is determined that a CSG cell is inside the service bandwidth of the macro cell as a result of the inter-frequency measurement, the scope of the invention is not limited thereto and a threshold value may be corrected when it is determined that a CSG cell is inside the service bandwidth of the macro cell as a result of the inter-frequency measurement in a similar way as described above. In this case, when a CSG cell that has a service bandwidth of a frequency different from that of a macro cell is detected in the inter-frequency measurement and then the service bandwidth of the CSG cell is inside the service bandwidth of the macro cell, handover control is performed with an appropriate threshold value that takes into consideration interference in the uplink from the UE 100 to the base station. Therefore, interference in the uplink from the UE 100 to the base station can be suppressed.

(Ninth Embodiment)

Figure 29:
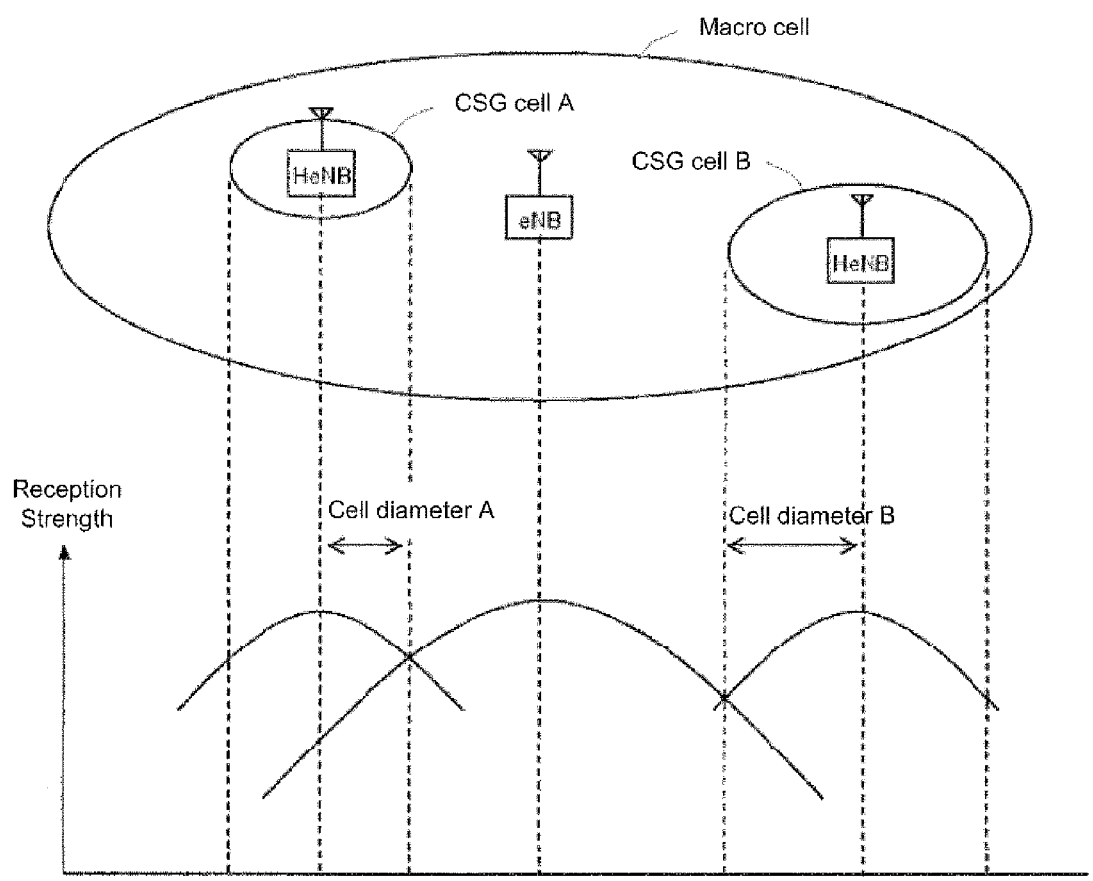
FIG. 29 is a diagram for illustrating cell radii of CSG cells in a ninth embodiment.
Figure 30:
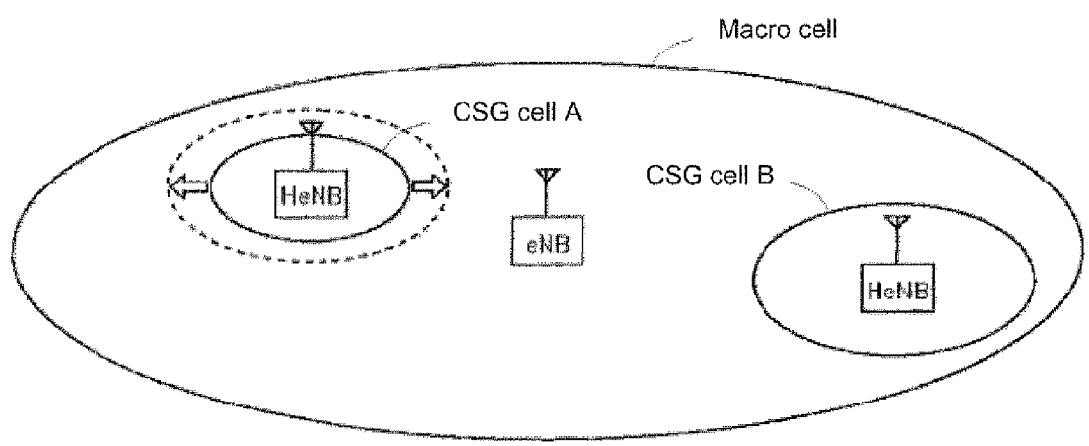
FIG. 30 is a diagram for illustrating an available range for handover in the ninth embodiment.
Figure 31:
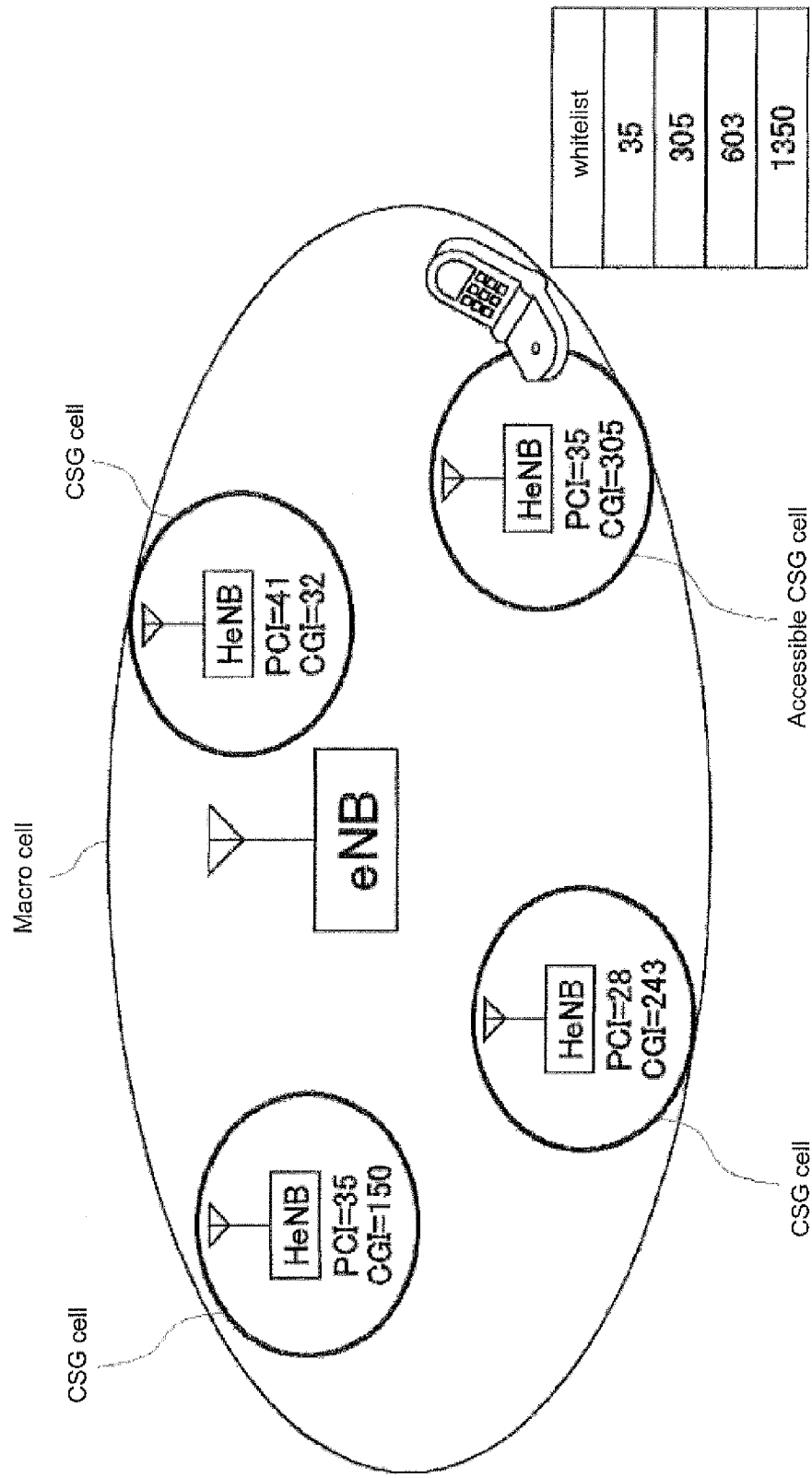
FIG. 31 is a diagram for illustrating an arrangement of a macro cell and CSG cells.
Figure 32:
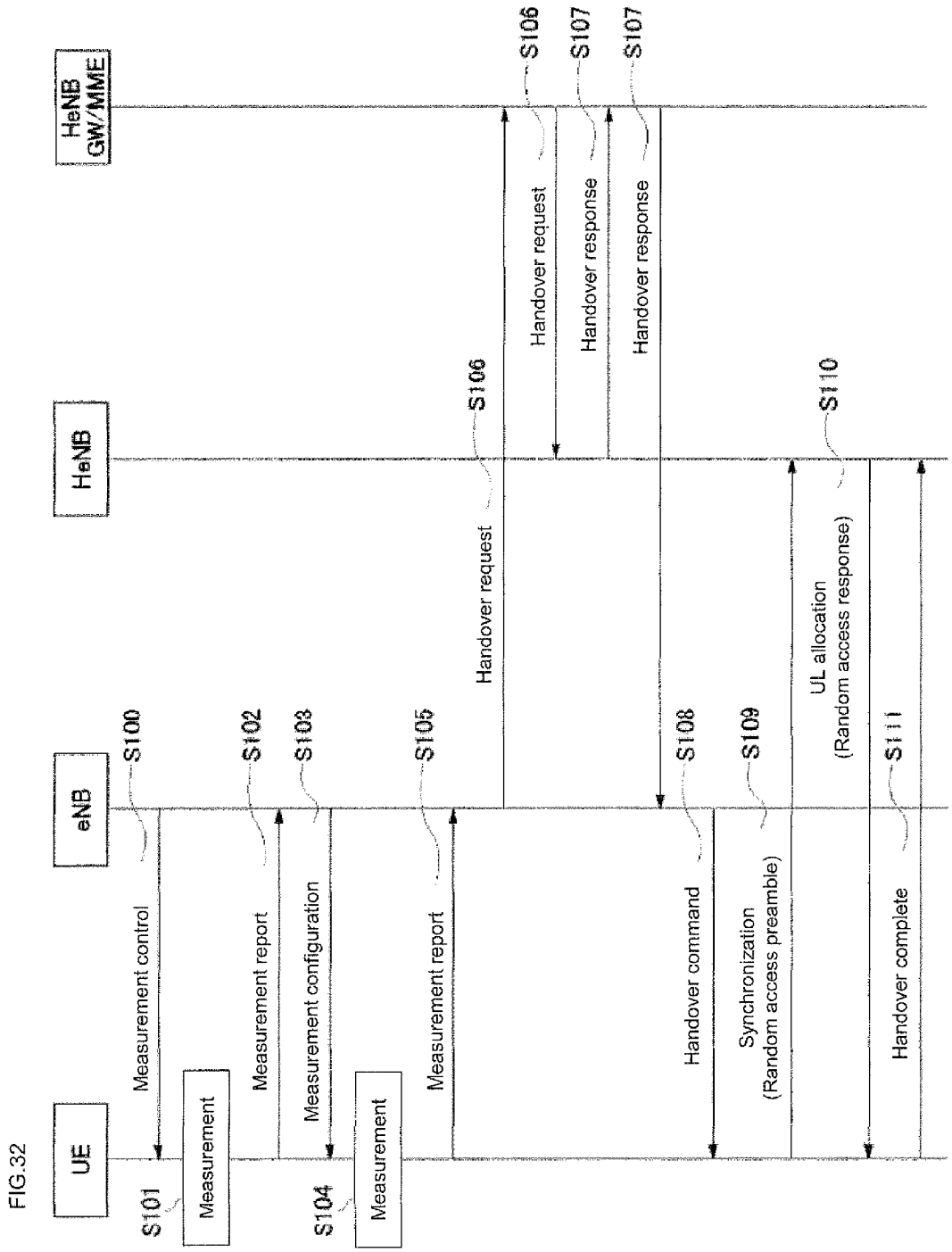
FIG. 32 is a sequence diagram showing a conventional way of handover to a CSG cell.
Figure 33:
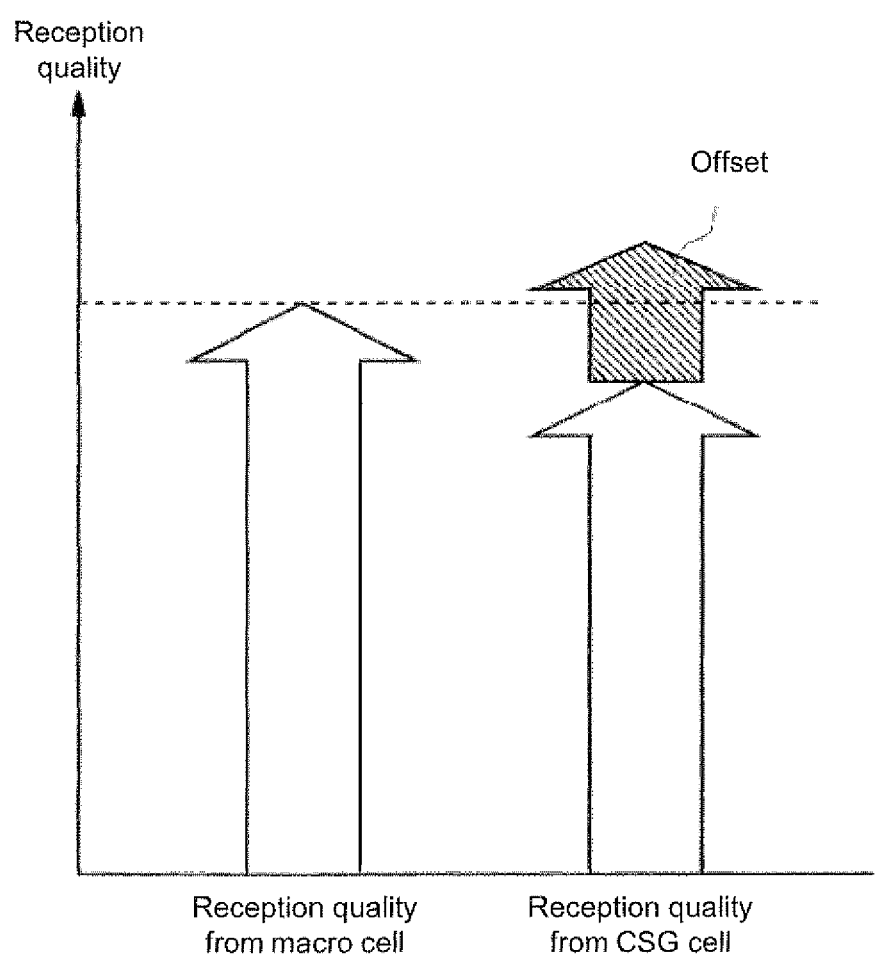
FIG. 33 shows conventional offsetting.

A communication system according to a ninth embodiment of the present invention will now be described below with reference to FIGS. 29 to 30. Here, description will primarily be made to differences of the embodiment from the first embodiment. The configuration and operation of the ninth embodiment are similar to those of the first embodiment unless otherwise noted.

In this embodiment, the transmission power of the UE 100 (uplink transmission power) is controlled to be constant, which is different from the first embodiment in which the transmission power of the UE 100 is controlled to increase. Similarly, in this embodiment, the transmission power of the HeNB 300 (downlink transmission power) is controlled to be constant, which is different from the first embodiment in which the transmission power of the HeNB 300 is controlled to increase. Further, in the first embodiment, the transmission power of the UE 100 or the HeNB 300 is controlled in order to facilitate a handover at a cell edge. However, this embodiment is different from the first embodiment in that it is intended to facilitate a handover near the eNB 200.

The offset value correcting unit 105 according to the embodiment corrects an offset value so that the offset value increases near the eNB 200. The offset value is corrected at such a level that, upon being handed over to a CSG cell, the UE 100 can receive an important control signal (for example, physical dedicated control channel, or PDCCH) among downlink signals of the HeNB 300 as a result of offsetting with a corrected offset value.

The offset value correction according to the embodiment will now be described with reference to drawings. As shown in FIG. 29, when the transmission power of the HeNB 300 (downlink transmission power) is constant, the radius of a CSG cell near the eNB 200 (CSG cell A) reduces due to a large amount of interference from the macro cell. On the other hand, a CSG cell at a cell edge of the macro cell (CSG cell B) has a larger radius due to less interference from the macro cell. In such a situation, it is conceivable that the UE 100 causes the offset value correcting unit 105 to correct an offset value so that the offset value increases when the UE 100 is located near the eNB 200 in order to eliminate inequality in service areas caused by the location of CSG cells.

According to the communication system according to the ninth embodiment of the invention, since an offset value is corrected so that the offset value increases near the eNB 200, even a CSG cell whose radius reduces near the eNB 200 can have an expanded available range for handover. As shown in FIG. 30, for example, even the CSG cell A (a CSG cell that has a smaller cell radius) located near the eNB 200 can have an expanded available range for handover as large as the CSG cell B (a CSG cell that has a larger cell radius) located near a cell edge. Further in this case, since the transmission power of the UE 100 is constant, interference in the uplink from the UE 100 to the base station can be suppressed. In addition, since the transmission power of the HeNB 300 is controlled to be constant, interference with other cells due to increase in the transmission power of the HeNB 300 can be reduced as compared to the case where the transmission power of the HeNB 300 is controlled to increase. Furthermore, since it is not necessary to control the transmission power of the HeNB 300 to change, processing in the HeNB 300 can be simplified.

Embodiments according to the present invention have been described by way of illustration. The scope of the invention, however, is not limited thereto and alteration and modification can be made thereto without departing from the scope of the invention as defined by the appended claims.

Although currently possible preferred embodiments of the invention have been described above, it is understood that various modifications can be made to the embodiments and it is intended that all such modifications that fall within the true spirit and scope of the invention are covered by the attached claims.

Industrial Applicability

As described above, a communication system according to the present invention has an advantage that it is possible to perform handover control with an appropriate offset value that takes into consideration interference in the uplink from a user equipment to a base station, and is useful for applications such as handover control from a macro cell to a CSG cell.

Reference Signs List

100 User equipment (UE)
101 Control unit
103 Setting signal receiving unit
104 Reception quality measurement unit
105 Offset value correcting unit
106 Offsetting unit
107 Measurement report creating/transmitting unit
109 Handover command receiving unit
115 Broadcasting signal receiving unit
116 Common offset storing unit
117 Reception quality determining unit
118 Threshold value correcting unit
119 Hybrid base station distinguishing unit
120 Hybrid permission determining unit
121 Cell sensing unit
122 Service bandwidth determining unit
200 Macro cell base station (eNB)
201 Control unit
204 Setting signal transmitting unit
205 Measurement report receiving unit
206 Handover determining unit
207 Handover request transmitting unit
208 Handover response receiving unit
209 Handover command transmitting unit
210 Broadcasting signal transmitting unit
211 Correction value storing unit
300 CSG cell base station (HeNB)
301 Control unit
304 Handover request receiving unit
306 Handover response transmitting unit
307 Transmission power controlling unit
308 Broadcasting signal transmitting unit
312 Correction value storing unit
313 Measurement report receiving unit

The invention claimed is:

1. A user equipment in which a handover from a macro cell base station to a small cell base station is controlled based on a result of comparison between macro cell reception quality and small cell reception quality, the macro cell reception quality being reception quality of a signal from the macro cell base station and the small cell reception quality being reception quality of a signal from the small cell base station located in a macro cell, the user equipment comprising:
- a reception quality measurement unit for measuring the macro cell reception quality and the small cell reception quality;
- an offsetting unit for offsetting the macro cell reception quality or the small cell reception quality with an offset value that makes the small cell reception quality relatively higher than the macro cell reception quality;
- an offset value correcting unit for correcting the offset value according to the macro cell reception quality; and
- a correction value receiving unit for receiving a first correction value and a second correction value set to a value larger than the first correction value from the macro cell base station,
- wherein the offset value correcting unit corrects the offset value with the first correction value when the macro cell reception quality is higher than a first threshold value, and corrects the offset value with the second correction value when the macro cell reception quality is lower than a second threshold value,
- wherein the transmission power of the small cell base station is controlled to increase when the macro cell reception quality is lower than the second threshold value, and
- the user equipment further comprises:
- a threshold value receiving unit for receiving a third threshold value from the small cell base station; and
- a reception quality determining unit for determining whether or not the small cell reception quality is higher than the third threshold value,
- wherein when it is determined that the small cell reception quality is higher than the third threshold value, the transmission power of the small cell base station is controlled to decrease.

2. The user equipment according to claim 1, wherein the first correction value and the second correction value are included in a setting signal for reception quality measurement transmitted from the macro cell base station to the user equipment.

3. The user equipment according to claim 1, wherein the first correction value and the second correction value are included in a broadcasting signal transmitted from the macro cell base station.

4. The user equipment according to claim 1, wherein the first correction value and the second correction value are set for each of at least one small cell base station, and are included in a broadcasting signal transmitted from the respective small cell base station.

5. The user equipment according to claim 1, wherein a plurality of the small cell base stations are located in the macro cell, and
- the offset value correcting unit corrects the offset value based on at least two values of the small cell reception quality.

6. The user equipment according to claim 5, wherein the offset value correcting unit corrects the offset value to decrease when a difference between highest small cell reception quality and second highest small cell reception quality is smaller than a predetermined fourth threshold value.

7. A base station device for a small cell base station for use in a communication system in which a handover of a user equipment from a macro cell base station to a small cell base station is controlled based on a result of comparison performed in the user equipment between macro cell reception quality and small cell reception quality, the macro cell reception quality being reception quality of a signal from the macro cell base station and the small cell reception quality being reception quality of a signal from the small cell base station located in a macro cell, the base station device comprising:
- a reception unit for receiving, from the macro cell base station, a control signal transmitted from the macro cell base station when it is determined in the macro cell base station that the user equipment is to be handed over based on the result of the comparison; determined that the macro cell reception quality is lower than the second threshold value; and
- a transmission power controlling unit for causing the small cell base station to increase transmission power based on the control signal;
- a transmission unit for transmitting a third threshold value to the user equipment through the macro cell base station; and
- a second reception unit for receiving, from the user equipment, a report that it is determined in the user equipment that the macro cell reception quality is higher than the third threshold value,
- wherein the transmission power controlling unit controls the transmission power of the small cell base station to decrease.

* * * * *